United States Patent
Hayashi

(10) Patent No.: US 9,760,318 B2
(45) Date of Patent: Sep. 12, 2017

(54) SYSTEM, PRINTING APPARATUS AND METHOD FOR CONTROLLING THE SAME, AND POST-PROCESSING APPARATUS AND METHOD FOR CONTROLLING THE SAME

(71) Applicant: CANON KABUSHIKI KAISHA, Tokyo (JP)

(72) Inventor: Kimio Hayashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/092,125

(22) Filed: Apr. 6, 2016

(65) Prior Publication Data

US 2016/0299726 A1 Oct. 13, 2016

(30) Foreign Application Priority Data

Apr. 10, 2015 (JP) ................................. 2015-081158

(51) Int. Cl.
G06K 15/00 (2006.01)
G06F 3/12 (2006.01)
G06K 15/02 (2006.01)

(52) U.S. Cl.
CPC .......... *G06F 3/1217* (2013.01); *G06F 3/1275* (2013.01); *G06K 15/1809* (2013.01); *G06K 15/4025* (2013.01)

(58) Field of Classification Search
None
See application file for complete search history.

(56) References Cited

U.S. PATENT DOCUMENTS

| | | | |
|---|---|---|---|
| 2007/0109586 A1* | 5/2007 | Yamada et al. | G06F 3/121 358/1.14 |
| 2007/0291286 A1 | 12/2007 | Utsunomiya et al. | |
| 2009/0052913 A1 | 2/2009 | Kawamura et al. | |
| 2009/0279137 A1 | 11/2009 | Mori | |
| 2010/0271672 A1 | 10/2010 | Nakamichi | |
| 2013/0120799 A1 | 5/2013 | Maeda | |
| 2016/0299727 A1* | 10/2016 | Hayashi | G06F 3/1217 |
| 2016/0299731 A1 | 10/2016 | Kayama | |
| 2016/0299732 A1 | 10/2016 | Mori | |

FOREIGN PATENT DOCUMENTS

| | | |
|---|---|---|
| JP | 2007-241648 A | 9/2007 |
| JP | 2008-110576 A | 5/2008 |

* cited by examiner

*Primary Examiner* — Dov Popovici
(74) *Attorney, Agent, or Firm* — Canon USA, Inc. I.P. Division

(57) ABSTRACT

At least one embodiment of a post-processing apparatus performs post-processing on a product printed by a printing apparatus, and transmits a command for a temporary stop of print processing for a first job and information indicating a period of time during which the temporary stop continues to the printing apparatus. At least one embodiment of the printing apparatus receives the command for the temporary stop of the print processing for the first job and the information indicating the period of time during which the temporary stop continues from the post-processing apparatus, stops the print processing for the first job according to the command for the temporary stop, and controls print processing for a second job based on the period of time during which the temporary stop continues.

9 Claims, 21 Drawing Sheets

```
<JMF xmlns="http://www.CIP4.org/JDFSchema_1_1" MaxVersion="1.5" SenderID="Finisher" TimeStamp="2013-09-18T10:58:27+02:00"
Version="1.5" xmlns:xsi="http://www.w3.org/2001/XMLSchema-instance" xsi:type="JMFRootMessage">
    <Command ID="m.609016672._000009" Type="PipePause" xsi:type="CommandPipePause">    ~61001
        <PipeParams JobID="J1" PipeID="PipeSheet" Duration="10" Unit="Minutes" Confirmation="true">    ~61002
            <AmountPool>
                <PartAmount>
                    <PartCondition="Waste" SetIndex="34 35"/>    ~61003
                </PartAmount>
            </AmountPool>
        </PipeParams>
    </Command>
</JMF>
```

```
<JMF xmlns="http://www.CIP4.org/JDFSchema_1_1" MaxVersion="1.5" SenderID="Printer" TimeStamp="2013-09-18T10:58:26+02:00"
Version="1.5" xmlns:xsi="http://www.w3.org/2001/XMLSchema-instance" xsi:type="JMFRootMessage">
    <Command ID="m.1349935098._000002" Type="PipePush" xsi:type="CommandPipePush">
        <PipeParams JobID="J1" PipeID="PipeSheet">                              ~62001
            <AmountPool>                    ~62002
                <PartAmount Amount="1">
                    <Part DocTags="Cover" SetIndex="0"/>
                </PartAmount>
                <PartAmount ActualAmount="1">
                    <Part DocTags="Cover" SetIndex="0" SheetIndex="0"/>
                </PartAmount>
            </AmountPool>
        </PipeParams>
    </Command>
</JMF>
```

6201

```
<JMF xmlns="http://www.CIP4.org/JDFSchema_1_1" MaxVersion="1.5" SenderID="Printer" TimeStamp="2013-09-18T10:58:27+02:00"
Version="1.5" xmlns:xsi="http://www.w3.org/2001/XMLSchema-instance" xsi:type="JMFRootMessage">
    <Command ID="m.1349935098._000008" Type="PipePush" xsi:type="CommandPipePush">
        <PipeParams JobID="J1" PipeID="PipeSheet">
            <AmountPool>
                <PartAmount Amount="7">
                    <Part DocTags="Body" SetIndex="35"/>  ~62011
                </PartAmount>
                <PartAmount ActualAmount="1">
                    <Part DocTags="Body" SetIndex="35" SheetIndex="4"/>
                </PartAmount>
            </AmountPool>
        </PipeParams>
    </Command>
</JMF>
```

```
<JMF xmlns="http://www.CIP4.org/JDFSchema_1_1" MaxVersion="1.5" SenderID="TestSender" TimeStamp="2013-09-
18T10:58:27+02:00" Version="1.5" xmlns:xsi="http://www.w3.org/2001/XMLSchema-instance" xsi:type="JMFRootMessage">
    <Command ID="m.587730553._000010" SenderID="Finisher" Type="PipePush" xsi:type="CommandPipePush">
        <PipeParams JobID="J1" PipeID="PipeSheet">
            <AmountPool>
                <PartAmount>
                    <Part SetIndex="34--1"/>  ~62021
                </PartAmount>
            </AmountPool>
        </PipeParams>
    </Command>
</JMF>
```

6203

```
<JMF xmlns="http://www.CIP4.org/JDFSchema_1_1" MaxVersion="1.5" SenderID="Printer" TimeStamp="2013-09-18T10:58:27+02:00"
Version="1.5" xmlns:xsi="http://www.w3.org/2001/XMLSchema-instance" xsi:type="JMFRootMessage">
    <Command ID="m.1349935098._000011" Type="PipePush" xsi:type="CommandPipePush">
        <PipeParams JobID="J1" PipeID="PipeSheet">
            <AmountPool>
                <PartAmount Amount="1">
                    <Part DocTags="Cover" SetIndex="34"/>  ~62031
                </PartAmount>
                <PartAmount ActualAmount="1">
                    <Part DocTags="Cover" SetIndex="34" SheetIndex="0"/>
                </PartAmount>
            </AmountPool>
        </PipeParams>
    </Command>
</JMF>
```

<JMF xmlns="http://www.CIP4.org/JDFSchema_1_1" MaxVersion="1.5" SenderID="TestSender" TimeStamp="2013-09-18T10:58:27+02:00"
Version="1.5" xmlns:xsi="http://www.w3.org/2001/XMLSchema-instance" xsi:type="JMFRootMessage">
    <Command ID="m.587730553._000010" SenderID="Finisher" Type="PipePull" xsi:type="CommandPipePull">
        <PipeParams JobID="J1" PipeID="PipeSheet">                                              ~63001
            <AmountPool>
                <PartAmount>
                    <Part SetIndex="34~1"/>~63002
                </PartAmount>
            </AmountPool>
        </PipeParams>
    </Command>
</JMF>
```

FIG.6D

```
6400
<JMF xmlns="http://www.CIP4.org/JDFSchema_1_1" MaxVersion="1.5" SenderID="Printer" TimeStamp="2013-09-18T10:58:27+02:00"
Version="1.5" xmlns:xsi="http://www.w3.org/2001/XMLSchema-instance" xsi:type="JMFRootMessage">
    <Command ID="m.1349935098._000017" Type="PipeClose" xsi:type="CommandPipeClose">     ~64001
        <PipeParams JobID="J1" PipeID="PipeSheet"> ~64002
            <AmountPool>
                <PartAmount>
                    <Part SetIndex="0~221"/>
                </PartAmount>
            </AmountPool>
        </PipeParams>
    </Command>
</JMF>
```

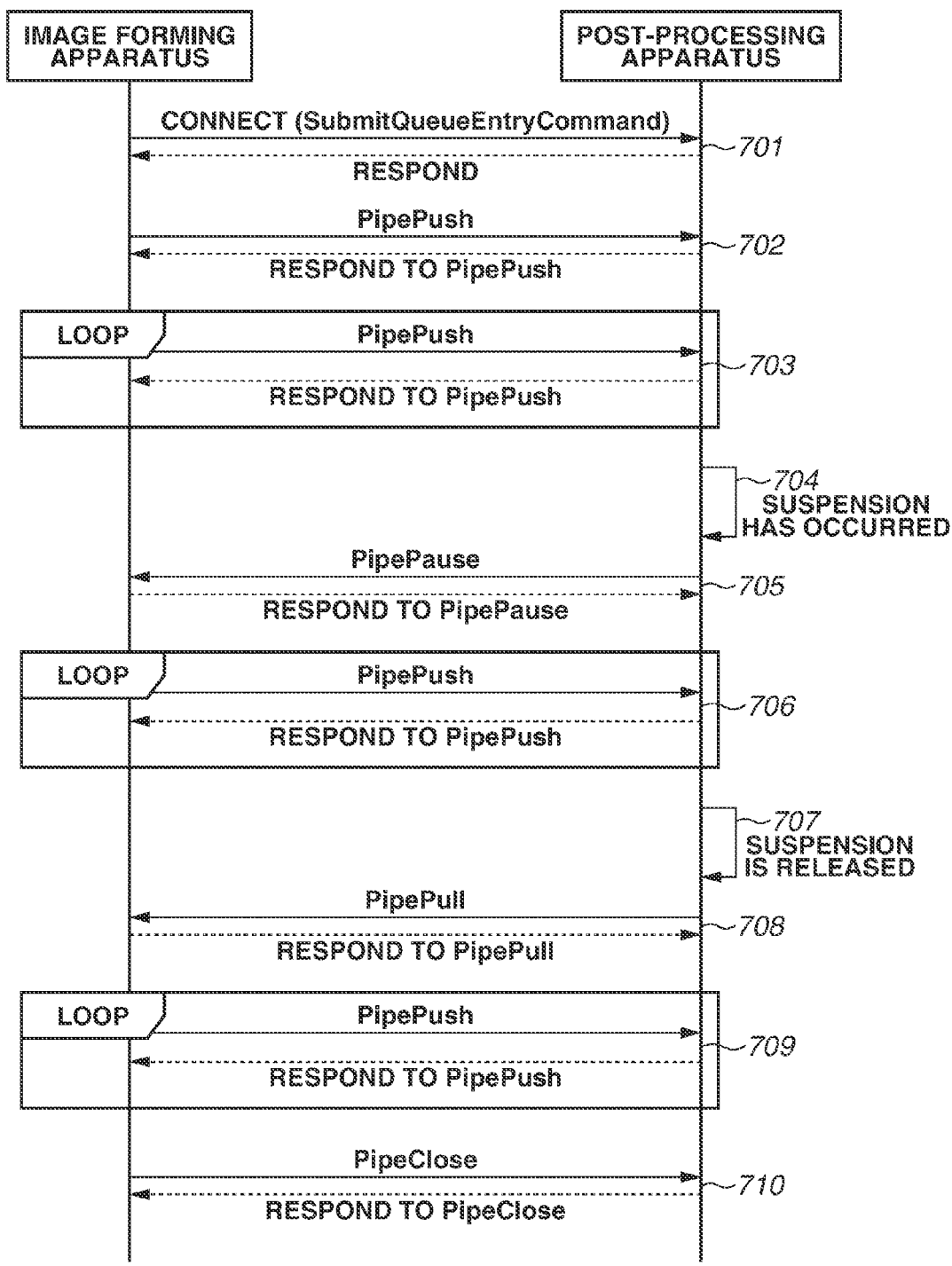

FIG.13A

```
<JDF ID="n_000004" JobID="J1" JobPartID="n_000002_1" MaxVersion="1.4" Status="Waiting" Type="Combined" Types="DigitalPrinting"
Version="1.4" xmlns="http://www.CIP4.org/JDFSchema_1_1"
xmlns:xsi="http://www.w3.org/2001/XMLSchema-instance" xsi:type="Combined">
    <AuditPool>
        <Created AgentName="CIP4 JDF Writer Java" AgentVersion="1.4a BLD 74" ID="a_000005" TimeStamp="2013-09-19T15:36:28+02:00"/>
    </AuditPool>
    <ResourcePool>
        <RunList Automation="Dynamic" Class="Parameter" ID="r_000006" Status="Available"/>
        <DigitalPrintingParams Class="Parameter" ID="r_000007" Status="Available"/>
        <Component Automation="Dynamic" Class="Quantity" ComponentType="PartialProduct Sheet" ID="r_000008" PartIDKeys="SetIndex
DocTags" PipeID="PipeSheet" PipeProtocol="JMFPush" Status="Unavailable" PipePause="100.0" PipeResume="10.0">
            <Component SetIndex="0~-1">
                <Component DocTags="Cover" SurfaceCount="2"/>
                <Component DocTags="Body" SurfaceCount="-1"/>
            </Component>
        </Component>
    </ResourcePool>
    <ResourceLinkPool>
        <RunListLink CombinedProcessIndex="0" Usage="Input" rRef="r_000006"/>
        <DigitalPrintingParamsLink CombinedProcessIndex="0" Usage="Input" rRef="r_000007"/>
        <ComponentLink Amount="1" CombinedProcessIndex="0" Usage="Output" rRef="r_000008" PipeURL="192.22.22.22">
            <Component SetIndex="0~-1">
            </ComponentLink>
    </ResourceLinkPool>
</JDF>
```

FIG.13B

```
<JDF ID="n_000009" JobID="J1" JobPartID="n_000002.2" MaxVersion="1.4" Status="Waiting" Type="Combined" Types="Collecting Stitching" Version="1.4"
xmlns="http://www.CIP4.org/JDFSchema_1_1" xmlns:xsi="http://www.w3.org/2001/XMLSchema-instance" xsi:type="Combined">
    <AuditPool>
        <Created AgentName="CIP4 JDF Writer Java" AgentVersion="1.4a BLD 74" ID="a_000010" TimeStamp="2013-09-19T15:36:28+02:00"/>
    </AuditPool>
    <ResourceLinkPool>
        <ComponentLink ProcessUsage="Cover" Usage="Input" rRef="r_000008">
            <Part DocTags="Cover" SetIndex="0~1"/>
        </ComponentLink>
        <ComponentLink CombinedProcessIndex="0" Usage="Input" rRef="r_000008">
            <Part DocTags="Body" SetIndex="0~1"/>
        </ComponentLink>
        <StitchingParamsLink CombinedProcessIndex="1" Usage="Input" rRef="r_000011"/>
        <ComponentLink Amount="1" CombinedProcessIndex="1" Usage="Output" rRef="r_000012"/>
    </ResourceLinkPool>
    <ResourcePool>
        <StitchingParams Class="Parameter" ID="r_000011" Status="Available"/>
        <Component Class="Quantity" ComponentType="FinalProduct Black" ID="r_000012" Status="Unavailable"/>
        <Component Automation="Dynamic" Class="Quantity" ComponentType="PartialProduct Sheet" ID="r_000008" PartIDKeys="SetIndex DocTags"
PipeID="PipeSheet" PipeProtocol="JMFPush" Status="Unavailable" PipePause="100.0" PipeResume="10.0" PipeURL="192.22.22.22">
            <Component SetIndex="0~1">         ──1603
            <Component DocTags="Cover" SurfaceCount="2"/>
            <Component DocTags="Body" SurfaceCount="-1"/>
        </Component>
    </Component>
    </ResourcePool>
</JDF>
```

```
TEMPORARILY STOP JOB

1401 — JOB ID:      [ J1 ]
1402 — PipeID:      [ P1 ]                         1404
1403 — STOP TIME:   [ 10 ]      UNIT: [ MINUTE ▼ ]

1405 — CONFIRM RESUMING: [✓]
                                            1406
                                      [ TEMPORARILY
                                            STOP ]
```

FIG.14B

```
TEMPORARILY STOP JOB

JOB ID:      [ J1 ]
PipeID:      [ P1 ]

1407 — STOP TIME:  ○ ONE HOUR   ○ THIRTY MINUTES   ◉ TEN MINUTES

CONFIRM RESUMING: [✓]
                                      [ TEMPORARILY
                                            STOP ]
```

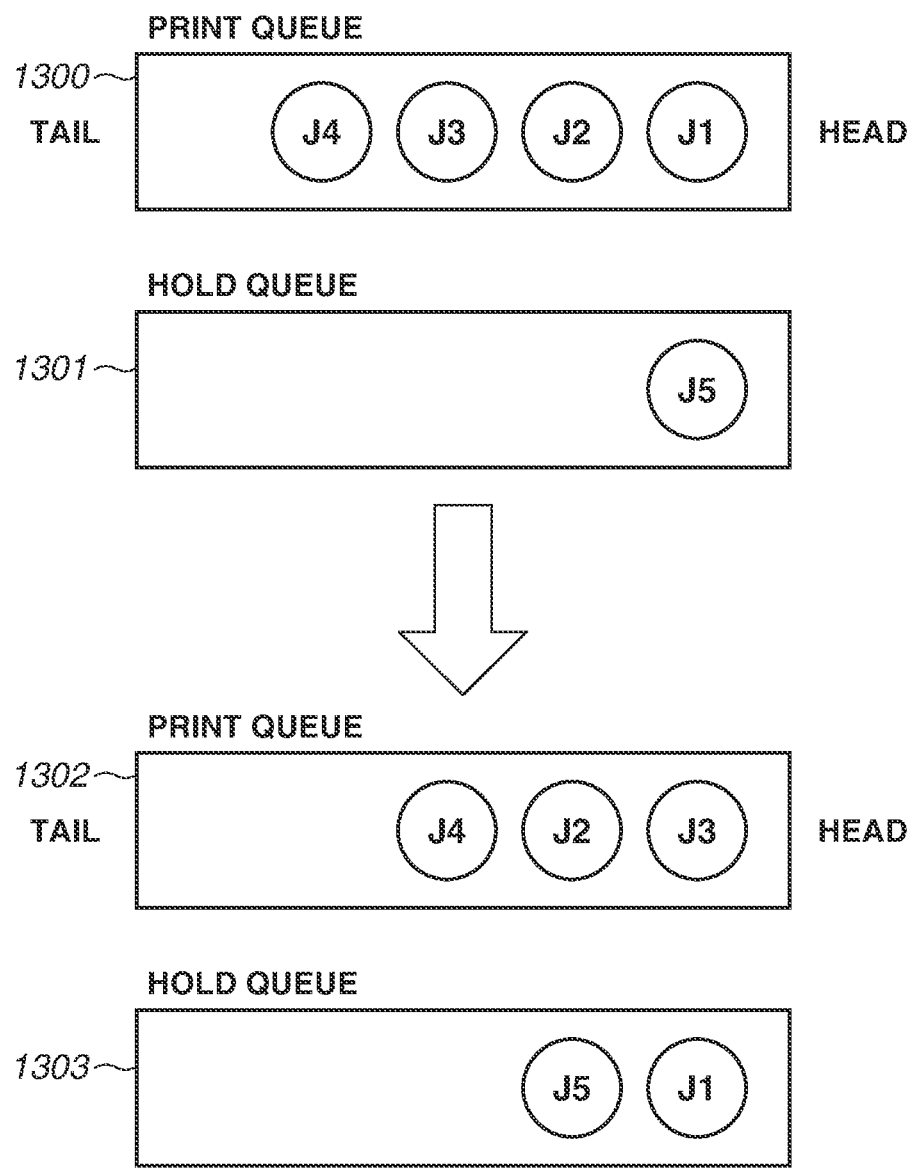

FIG.16

| JOB ID | JOB NAME | QUEUE | STATE | PROCESSING TIME | SETTING OF POST-PROCESSING |
|---|---|---|---|---|---|
| 001 | J1 | PRINT QUEUE | IN PROCESS | — | CASE BINDING |
| 002 | J2 | PRINT QUEUE | WAITING | 2 MINUTES | CASE BINDING |
| 003 | J3 | PRINT QUEUE | WAITING | 5 MINUTES | — |
| 004 | J4 | PRINT QUEUE | WAITING | 15 MINUTES | THREE-SIDE CUTTING |
| 005 | J5 | HOLD QUEUE | WAITING | 40 MINUTES | — |

1700

SYSTEM, PRINTING APPARATUS AND METHOD FOR CONTROLLING THE SAME, AND POST-PROCESSING APPARATUS AND METHOD FOR CONTROLLING THE SAME

BACKGROUND OF THE INVENTION

Field of the Invention

The present disclosure relates to a technique for producing a product by performing post-processing on a print product output from an image forming apparatus with use of a post-processing apparatus.

Description of the Related Art

Conventionally, in the commercial printing industry, various products have been produced by combining an image forming apparatus and a post-processing apparatus. For example, an advanced product can be produced by setting a print product on the post-processing apparatus after the image forming apparatus performs print processing to output the print product, and performing post-processing (after processing), such as bookbinding and cutting, thereon.

In such a configuration, the print processing by the image forming apparatus and the post-processing by the post-processing apparatus may be performed in parallel with each other to improve productivity associated with the production. More specifically, while the print product is output from the image forming apparatus, this print product is transferred to the post-processing apparatus by being manually carried or via a conveyor belt. The post-processing apparatus produces the product by performing the post-processing on the received print product as needed.

For example, Japanese Patent Application Laid-Open No. 2008-110576 discusses a technique for causing the image forming apparatus to receive an instruction to stop the printing via a user interface, and stop the print processing currently in progress.

However, although the technique discussed in Japanese Patent Application Laid-Open No. 2008-110576 allows the image forming apparatus to stop the printing via the user interface of the image forming apparatus, this technique does not include consideration of stopping the printing from the post-processing apparatus that performs the post-processing on the product printed by the image forming apparatus. Therefore, for example, even when the post-processing apparatus side cannot perform the post-processing and it is desired to stop the print processing performed by the image forming apparatus, the print processing cannot be stopped. Further, in a case where the print processing performed by the image forming apparatus is temporarily stopped according to an instruction from the post-processing apparatus, and if the post-processing apparatus transmits only the temporary stop instruction, the image forming apparatus cannot recognize timing of when to resume the print processing, which results in deterioration in productivity of the entire system.

SUMMARY OF THE INVENTION

The present disclosure has been made at least in part in consideration of the above-described issue, and is directed to providing a technique capable of reducing the deterioration in the productivity of the entire system even when the print processing performed by the image forming apparatus is temporarily stopped, according to the instruction from the post-processing apparatus that performs the post-processing on the product printed by the image forming apparatus.

According to an aspect of the present disclosure, a system includes a printing apparatus, and a post-processing apparatus, wherein the post-processing apparatus includes: a post-processing unit configured to perform post-processing on a product printed by the printing apparatus, and a transmission unit configured to transmit a command for a temporary stop of print processing for a first job and information indicating a period of time during which the temporary stop continues to the printing apparatus, and wherein the printing apparatus includes: a printing unit, a reception unit configured to receive the command for the temporary stop of the print processing for the first job and the information indicating the period of time during which the temporary stop continues from the post-processing apparatus, a stop unit configured to stop the print processing for the first job according to the command for the temporary stop, and a control unit configured to control print processing for a second job based on the time during which the temporary stop continues.

According to other aspects of the present disclosure, one or more additional systems, one or more printing apparatuses, one or more methods for controlling same, one or more post-processing apparatuses, one or more methods for controlling same and one or more storage mediums are discussed herein. Further features of the present disclosure will become apparent from the following description of exemplary embodiments with reference to the attached drawings.

BRIEF DESCRIPTION OF THE DRAWINGS

FIGS. 6A, 6B (consisting of FIGS. 6B1 and 6B2), 6C, and 6D are diagrams illustrating examples of commands (messages) generated by the information processing system according to the present exemplary embodiment.

FIG. 7 is an example of a sequence diagram illustrating communication processing in the information processing system according to the present exemplary embodiment.

FIGS. 13A and 13B are diagrams each illustrating an example of a job ticket according to the present exemplary embodiment.

FIGS. 14A and 14B are diagrams each illustrating an example of an operation panel of the post-processing apparatus according to the present exemplary embodiment.

FIG. 15 is a diagram illustrating examples of a Print queue and a Hold queue according to the present exemplary embodiment.

FIG. 16 is a diagram illustrating an example of job information according to the present exemplary embodiment.

DESCRIPTION OF THE EMBODIMENTS

In the following description, an exemplary embodiment for the present disclosure will be described with reference to the drawings.

Figure 1:
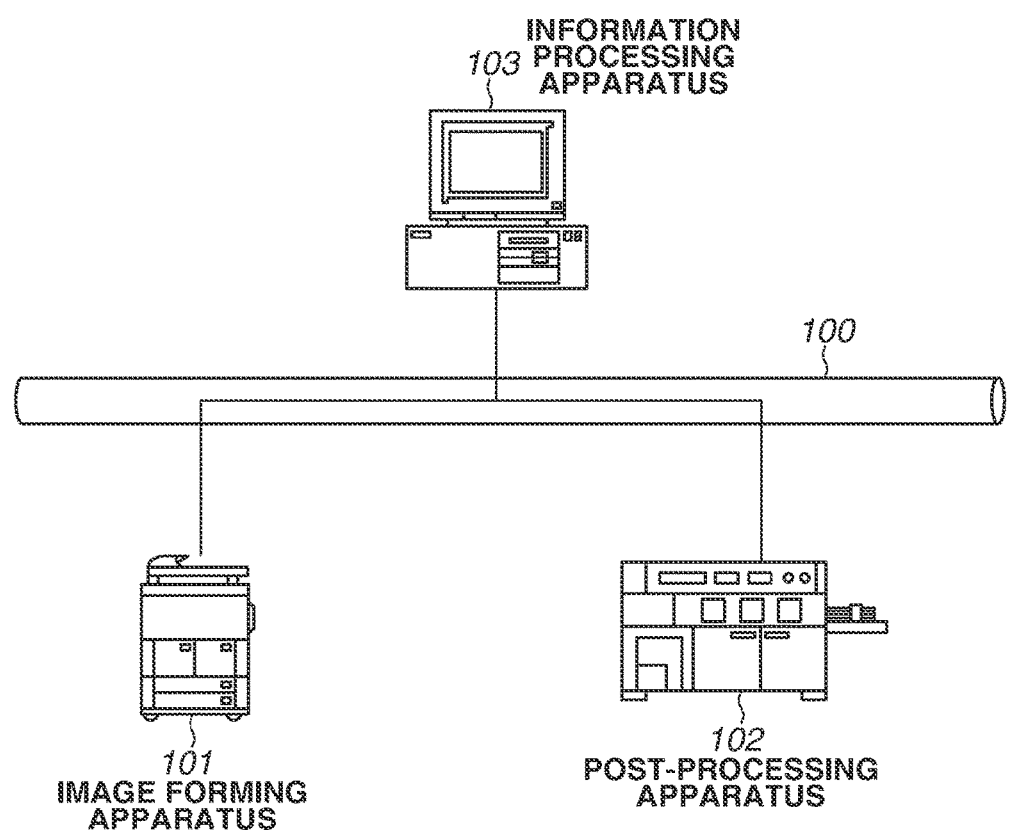
FIG. 1 illustrates a system configuration of an information processing system according to an exemplary embodiment of the present disclosure.

FIG. 1 illustrates an overall configuration of an information processing system according to the exemplary embodiment of the present disclosure. An environment of the entire information processing system, which will be described in the following description, is merely an example for facilitating understanding of the present disclosure, and the present disclosure is not limited to this environment.

In FIG. 1, an image forming apparatus 101, a post-processing apparatus 102, and an information processing apparatus 103 are connected to a network 100. The image forming apparatus 101 analyzes print data including print character data transmitted from the information processing apparatus 103 or the like, converts the print data into a dot image page by page, and prints the print data. Further, the image forming apparatus 101 communicates with the post-processing apparatus 102 via the network 100 to transmit and receive control information and the like thereto and therefrom. A print product output from the image forming apparatus 101 is transferred to the post-processing apparatus 102 by being carried manually by a print operator, or is transferred to the post-processing apparatus 102 via a not-illustrated conveyor belt. The post-processing apparatus 102 performs post-processing (after processing), such as cutting, bookbinding, and folding, on the print product output from the image forming apparatus 101. The post-processing apparatus 102 is a post-processing apparatus capable of communicating with the image forming apparatus 101 and the information processing apparatus 103 via the network 100. A program such as a workflow management program and a web server runs on the information processing apparatus 103. Further, a printer driver program or the like, which is used for connecting the image forming apparatus 101 with the post-processing apparatus 102 via the network 100 and controlling the image forming apparatus 101, is installed in the information processing apparatus 103. FIG. 1 illustrates the information processing system as including a signal apparatus as each of the image forming apparatus 101, the post-processing apparatus 102, and the information processing apparatus 103, but the information processing system may include a plurality of apparatuses as each of them. Alternatively, the information processing system may not include the information processing apparatus 103. Further, the network 100 may be the Internet, and for example, the information processing system may be configured in such a manner that the information processing apparatus 103 has Internet access to the image forming apparatus 101 and the post-processing apparatus 102. The image forming apparatus 101 is a printing apparatus, and the post-processing apparatus 102 is a print product processing apparatus.

<Examples of Hardware Configurations in Information Processing System>

Figure 2:
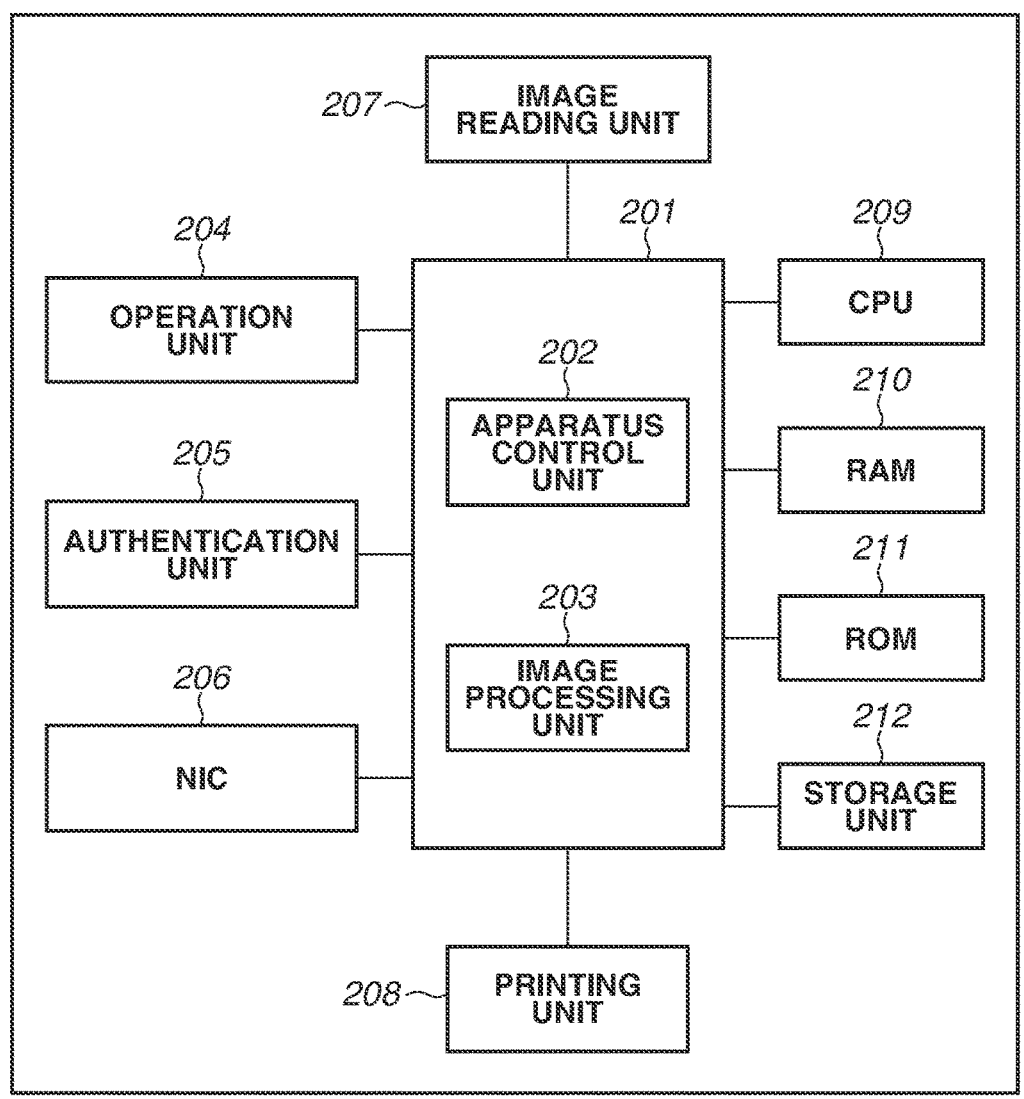
FIG. 2 is a block diagram illustrating a hardware configuration of an image forming apparatus according to the present exemplary embodiment.

FIG. 2 illustrates a hardware configuration of the image forming apparatus 101 according to the present exemplary embodiment. The image forming apparatus 101 includes an operation unit 204, an authentication unit 205, a network interface card (NIC) 206, a central processing unit (CPU) 209, a random access memory (RAM) 210, a read only memory (ROM) 211, a storage unit 212, an image reading unit 207, and a printing unit 208, which are connected to one another via a control unit 201. The control unit 201 includes an apparatus control unit 202, which controls the entire image forming apparatus 101, and an image processing unit 203, which processes image data. The operation unit 204 includes, for example, a software keyboard, a touch panel, and/or another input/output device, and can input and display various kinds of setting values. The CPU 209 executes a program stored in the ROM 211, and a program loaded from the storage unit 212 into the RAM 210, such as an application. In other words, the CPU 209 functions as each of processing units for performing processing illustrated in each of flowcharts that will be described below, by executing the program stored in a readable storage medium. The RAM 210 is a main memory of the CPU 209, and functions as a work area and the like. The image reading unit 207 includes, for example, a scanner, and can acquire a document image in an image data format (for example, the Joint Photographic Experts Group (JPEG) format or the bitmap format) by reading a paper document or the like. The control unit 201 performs processing for providing a document image stored in the storage unit 212 to the operation unit 204 to output the document image onto the operation unit 204. Further, similarly, the control unit 201 provides the document image stored in the storage unit 212 to the printing unit 208, and the printing unit 208 performs processing for outputting the document image in various forms. For example, the printing unit 208 can perform processing for outputting the document image into a storage medium. Alternatively, the printing unit 208 may perform processing for outputting the document image onto an output medium such as a paper medium, as the printing unit 208 has a printing function. Further, the image forming apparatus 101 is capable of connecting to the network 100 via the NIC 206, and transmitting and receiving data. The data acquired via the NIC 206 can also be displayed on the operation unit 204.

Figure 3:
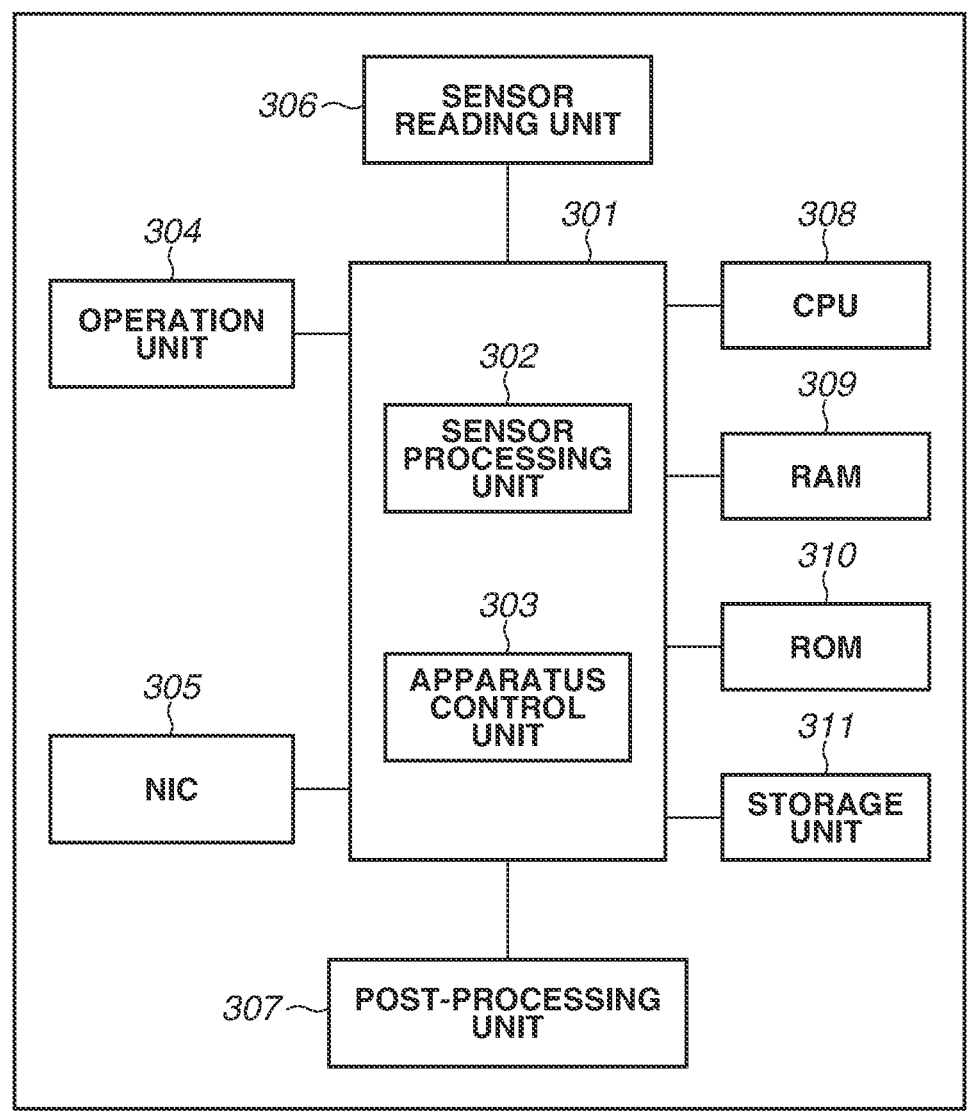
FIG. 3 is a block diagram illustrating a hardware configuration of a post-processing apparatus according to the present exemplary embodiment.

FIG. 3 illustrates a hardware configuration of the post-processing apparatus 102 according to the present exemplary embodiment. The post-processing apparatus 102 includes an operation unit 304, an NIC 305, a CPU 308, a RAM 309, a ROM 310, a storage unit 311, a sensor reading unit 306, and a post-processing unit 307, which are connected to one another via a control unit 301. The control unit 301 includes a sensor processing unit 302, which processes sensor information read by the sensor reading unit 306, and an apparatus control unit 303, which controls the entire post-processing apparatus 102. The operation unit 304 includes, for example, a software keyboard, a touch panel, and/or another input/output device, and can input and display various kinds of setting values. The CPU 308 executes a program stored in the ROM 310, and a program loaded from the storage unit 311 into the RAM 309, such as an application. In other words, the CPU 308 functions as each of processing units for performing the processing illustrated in each of the flowcharts that will be described below, by executing the program stored in a readable storage medium. The RAM 309 is a main memory of the CPU 308, and functions as a work area and the like. The sensor reading unit 306 can read job information (for example, for checking a combination of a front cover and a body of a case binding job) of the print product that is a post-processing target, and the like via a device such as a camera. The control unit 301 performs processing for providing post-processing information stored in the storage unit 311 to the operation unit 304 to output information indicating a setting of the post-processing onto the operation unit 304. Further, similarly, the control unit 301 provides the post-processing information stored in the storage unit 311 to the post-processing unit 307, and the post-processing unit 307 performs the post-processing in various forms. Further, the post-processing apparatus 102 is capable of connecting to the network 100 via the NIC 305, and transmitting and receiving data. The data acquired via the NIC 305 can also be displayed on the operation unit 304.

Figure 4:
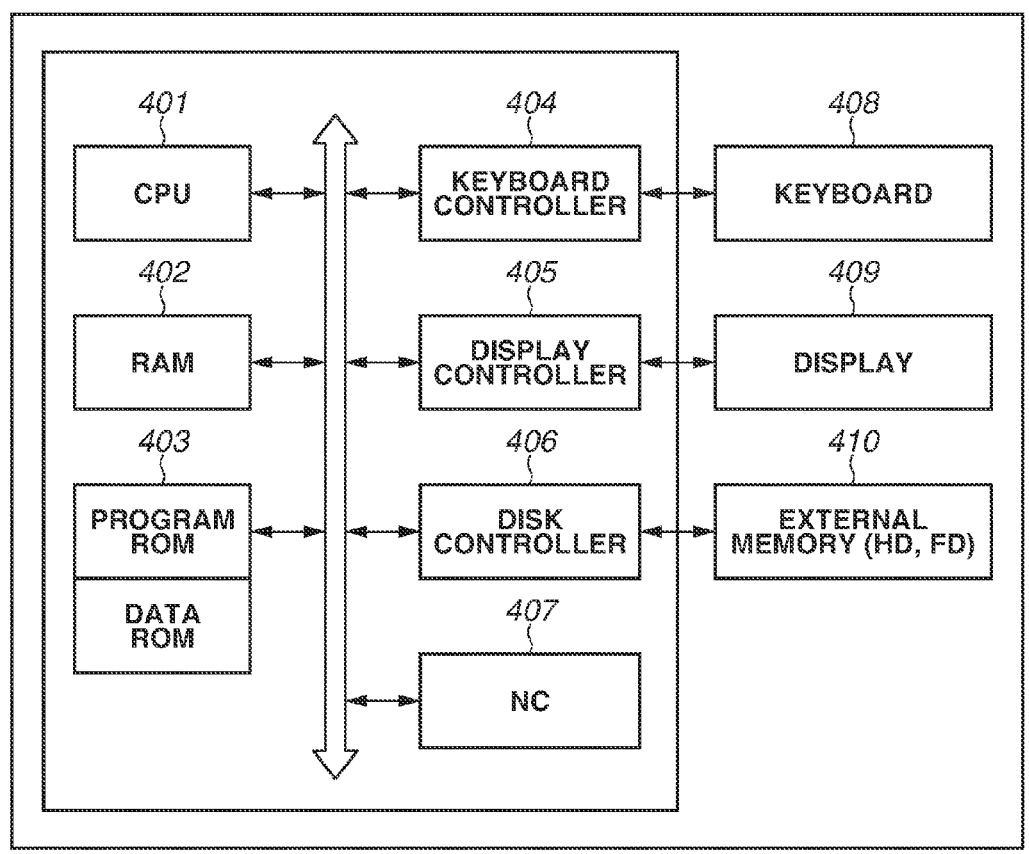
FIG. 4 is a block diagram illustrating a hardware configuration of an information processing apparatus according to the present exemplary embodiment.

FIG. 4 illustrates a hardware configuration of the information processing apparatus 103 according to the present exemplary embodiment. The information processing apparatus 103 can be constructed with use of hardware of a commonly-used computer (a personal computer (PC)). In FIG. 4, a CPU 401 executes a program stored in a program ROM in a ROM 403, and a program loaded from an external memory 410 into a RAM 402, such as an operating system (OS) and an application.

In other words, the CPU 401 functions as each of processing units for performing the processing illustrated in each of the flowcharts that will be described below, by executing this program stored in a readable storage medium. The RAM 402 is a main memory of the CPU 401, and functions as a work area and the like. A keyboard controller 404 controls an operation input from a keyboard 408 or a not-illustrated pointing device (a mouse, a touch pad, a touch panel, a trackball, or the like). A display controller 405 controls what is displayed on a display 409. A disk controller 406 controls data access to the external memory 410 storing various kinds of data, such as a hard disk (HD) and a flexible disk (FD). A network controller (NC) 407 is connected to the network 100, and performs processing for controlling communication with another apparatus connected to the network 100.

Figure 5:
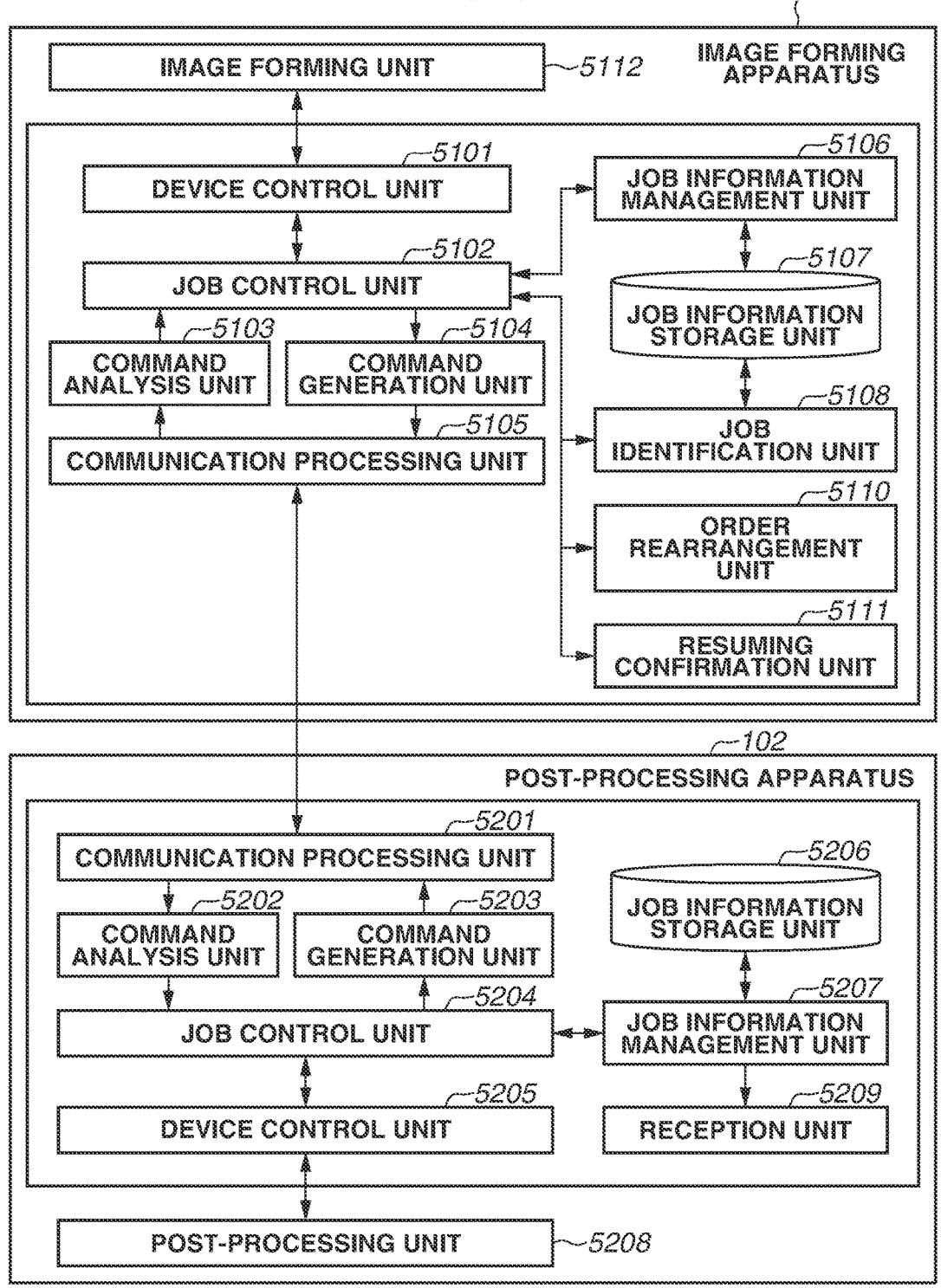
FIG. 5 is a block diagram illustrating a software configuration of the image forming apparatus and a software configuration of the post-processing apparatus according to the present exemplary embodiment.

FIG. 5 is a functional block diagram illustrating each of functions of the image forming apparatus 101 and the post-processing apparatus 102 in the information processing system according to the present exemplary embodiment. The present exemplary embodiment will be described based on an example in which the image forming apparatus 101 and the post-processing apparatus 102 communicate with each other with use of commands (messages) illustrated in FIGS. 6A to 6D. Therefore, the functional block diagrams of the image forming apparatus 101 and the post-processing apparatus 102 will be described now.

A function of each of the processing units of the image forming apparatus 101 will be described. A device control unit 5101 controls an image forming unit 5112 according to a print instruction from a job control unit 5102. The job control unit 5102 performs control regarding processing a print job. More specifically, the job control unit 5102 instructs the device control unit 5101 regarding the print processing and transmits a command regarding the post-processing to the post-processing apparatus 102 based on print job information stored in a job information storage unit 5107 and a command received from the post-processing apparatus 102. A command analysis unit 5103 analyzes a command (a command, such as the commands illustrated in FIGS. 6A to 6D, which will be described below) received from the post-processing apparatus 102 or the information processing apparatus 103. A command generation unit 5104 generates a command (a command such as the commands illustrated in FIGS. 6A to 6D, which will be described below) to be transmitted to the post-processing apparatus 102 or the information processing apparatus 103. A communication processing unit 5105 carries out data communication with the post-processing apparatus 102 and the information processing apparatus 103. A job information management unit 5106 manages the print job information stored in the job information storage unit 5107. The job information storage unit 5107 stores the information regarding the print job, based on which the image forming apparatus 101 performs the print processing. FIG. 16 illustrates an example of the information stored in the job information storage unit 5107, and illustrates a list 1700 of jobs held by the image forming apparatus 101. The list 1700 includes a job identification (ID), a job name, queue information indicating whether the job is placed in a Print queue or a Hold queue, a state indicating whether the job is in process, waiting, or the like, a processing time that will be taken when this job is processed by the image forming apparatus 101, and information on a setting of the post-processing. The image forming unit 5112 is a processing mechanism that performs the print processing.

A job identification unit 5108 identifies a job to be rearranged in terms of an order by an order rearrangement unit 5110, which will be described below. More specifically, the job identification unit 5108 identifies a job that can be completed within a temporary stop time written in a temporary stop command received from the post-processing apparatus 102, from jobs in the Print queue and the Hold queue managed by the job control unit 5102. FIG. 15 illustrates examples of the Print queue and the Hold queue. The job control unit 5102 processes jobs in order, starting from a job placed at the head of the Print queue. A job in the Hold queue is moved to the tail of the Print queue in a case where a processing instruction for the job is issued from the operation unit 204 of the image forming apparatus 101. The job identification unit 5108 further identifies a job not supposed to be processed by the post-processing apparatus 102 that has transmitted the temporary stop command, from the waiting job(s) identified by the job identification unit 5108. The order rearrangement unit 5110 rearranges the order of the job held in the image forming apparatus 101. More specifically, the order rearrangement unit 5110 moves a job with respect to which the temporary stop command has been issued, into the Hold queue. Then, the order rearrangement unit 5110 moves the job identified by the job identification unit 5108 to the head of the Print queue. As a result, the job control unit 5102 prints the above-described job moved by the order rearrangement unit 5110 to the head of the Print queue. A resuming confirmation unit 5111 determines whether the temporary stop time received from the job control unit 5102 has elapsed. In a case where the temporary stop time has elapsed, the resuming confirmation unit 5111 instructs the command generation unit 5104 to confirm resuming of the processing via the job control unit 5102. The command generation unit 5104 generates an output notification command (a "Push" command) illustrated in FIG. 6B (consisting of FIGS. 6B1 and 6B2) upon receiving the above-described instruction from the job control unit 5102. The communication processing unit 5105 transmits the output notification command (the "Push" command) generated by the command generation unit 5104 to the post-processing apparatus 102. More specifically, the image forming apparatus 101 transmits the output notification command to the post-processing apparatus 102 after tentatively updating the number of copies in resource information (Resource) written in the output notification command without actually producing a resource. Upon receiving the output notification command, the post-processing apparatus 102 transmits the temporary stop command (a "Pause" command) or an output request command (a "Pull" command). The image forming apparatus 101 can confirm the resuming just by performing processing according to a type of the received command.

A function of each of the processing units of the post-processing apparatus 102 will be described. A communication processing unit 5201 carries out data communication with the image forming apparatus 101 and the information processing apparatus 103. A command analysis unit 5202 analyzes a command (a command such as the commands illustrated in FIGS. 6A to 6D, which will be described below) received from the image forming apparatus 101 or the information processing apparatus 103. A command generation unit 5203 generates a command (a command such as the commands illustrated in FIGS. 6A to 6D, which will be described below) to be transmitted to the image forming apparatus 101 or the information processing apparatus 103. A job control unit 5204 performs control regarding processing a post-processing job for which the post-processing apparatus 102 performs the post-processing. More specifically, the job control unit 5204 issues an instruction regarding the post-processing to a device control unit 5205 and transmits a command regarding the print processing to the image forming apparatus 101, based on information about the post-processing job stored in a job information storage unit 5206 and the command received from the image forming apparatus 101. The device control unit 5205 controls a post-processing unit 5208 according to the post-processing instruction from the job control unit 5204. The job information storage unit 5206 stores the information regarding the post-processing job, based on which the post-processing apparatus 102 performs the post-processing. The information about the post-processing job also includes instruction information indicating what kind of post-processing should be performed for each job. For example, if the post-processing is set for the case binding, the information about the post-processing job includes information such as sheet sizes, sheet types, and finishing sizes of the front cover and the body. These pieces of information are received from the information processing apparatus 103 or the image forming apparatus 101 via a job ticket in advance, or input by the operator from the operation unit 304 of the post-processing apparatus 102. A job information management unit 5207 manages the information about the post-processing job stored in the job information storage unit 5206. The post-processing unit 5208 is a processing mechanism that performs the post-processing.

A receiving unit 5209 receives an input of a command for temporarily stopping processing performed by a communication partner from an operation panel illustrated in FIG. 14, which will be described below.

<Examples of Commands (Messages) Generated by Information Processing System>

FIGS. 6A to 6D are diagrams illustrating examples of formats of the commands (the messages) generated by the command generation unit 5104 of the image forming apparatus 101 and the command generation unit 5203 of the post-processing apparatus 102 in the information processing system according to the present exemplary embodiment. A sequence indicating an exchange of the commands will be described with reference to FIG. 7.

FIG. 6B illustrates commands used for an apparatus to notify the communication partner that the apparatus starts the processing of this apparatus itself, notify the communication partner that the apparatus has started the processing of this apparatus itself, or confirm the resuming of the processing of this apparatus itself to the communication partner. In the present exemplary embodiment, these commands will be collectively referred to as the output notification command or the "Push" command. For example, the image forming apparatus 101 can instruct the post-processing apparatus 102 to perform the post-processing on the print product output from the image forming apparatus 101 by transmitting the output notification command to the post-processing apparatus 102.

A command 6200 is an example of the output notification command that is transmitted from the image forming apparatus 101 to the post-processing apparatus 102 for starting communication. Type="PipePush" is written and xsi:type="CommandPipePush" is further written in a portion 62001, which make the command 6200 the output notification command. The command 6200 specifies an identification (ID) of the communication (Pipe) by PipeID="PipeSheet" in a PipeParams element in a portion 62002. However, "PipeSheet" is an example of PipeID, and the ID may be assigned in any manner. The use of PipeID allows the command to be identified as to which communication this command is associated with. After the communication is started, this output notification command is transmitted to the post-processing apparatus 102 every time the image forming apparatus 101 outputs the resource (for example, the print product) to the post-processing apparatus 102.

A command 6201 is an example of the output notification command for notifying the post-processing apparatus 102 that the image forming apparatus 101 has output the resource (for example, the print product). A portion 62011 notifies the post-processing apparatus 102 that the image forming apparatus 101 has output one copy of a body of a thirty-fifth set among seven copies.

A command 6202 is an example of the output notification command that is transmitted from the image forming apparatus 101 to the post-processing apparatus 102 for confirming whether the image forming apparatus 101 is permitted to resume temporarily stopped processing to the post-processing apparatus 102. In a portion 62021, SetIndex="34~–1" is specified in a Part element, by which the command 6202 confirms whether the image forming apparatus 101 is permitted to resume the processing from a thirty-fourth set. In the present example, "–1" means execution of the processing to the last.

A command 6203 is the output notification command for notifying the post-processing apparatus 102 that the image forming apparatus 101 has output the resource (for example, the print product) after resuming the temporarily stopped processing. A portion 62031 indicates that the image forming apparatus 101 has resumed the processing from the thirty-fourth set. The output notification command is transmitted to the post-processing apparatus 102 every time the image forming apparatus 101 outputs the resource.

FIG. 6A illustrates a command for temporarily stopping the processing performed by the communication partner. In the present exemplary embodiment, this command will be referred to as the temporary stop command or the "Pause" command. For example, the post-processing apparatus 102 can instruct the image forming apparatus 101 to stop the print processing by transmitting this command (the "Pause" command) to the image forming apparatus 101. In the present exemplary embodiment, the "Pause" command will be described based on the example in which the post-processing apparatus 102 transmits this command (the "Pause" command) to the image forming apparatus 101.

A command 6100 is the temporary stop command that is transmitted from the post-processing apparatus 102 to the image forming apparatus 101 in a case where it is desired to temporarily stop the processing performed by the image forming apparatus 101 because a paper jam has occurred at the post-processing apparatus 102 and the post-processing apparatus 102 cannot perform the post-processing. In the present exemplary embodiment, the temporary stop command will be described based on an example that information indicating a period of time during which the temporary stop continues and information indicating whether the communication partner transmits the confirmation of the resuming after temporarily stopping the processing are transmitted together with the temporary stop command to the communication partner. Type="PipePause" is written and xsi:type="CommandPipePause" is further written in a portion 61001, which make the command 6100 the temporary stop command. A PipeParams element in a portion 61002 is a parameter in which an instruction to the communication partner is written. Duration="10" and Unit="Minutes" are written as an example of the information indicating the period of time during which the temporary stop continues. In other words, the command 6100 indicates that the image forming apparatus 101 stops the print processing for ten minutes from the temporary stop of the processing until the resuming of the processing. Examples of Unit include Seconds, Hours, and Days. The post-processing apparatus 102 can allow the image forming apparatus 101 to know the temporary stop time, i.e., a waiting time in the image forming apparatus 101 by transmitting the information indicating the period of time during which the temporary stop continues together with the temporary stop command to the image forming apparatus 101. Therefore, the transmission of this information allows, for example, the image forming apparatus 101 to process another print job during this waiting time.

Further, Confirmation="true" or Confirmation="false" is written as the information indicating whether the communication partner transmits the confirmation of the resuming after temporarily stopping the processing. In a case where Confirmation="true" is written, the command 6100 instructs the image forming apparatus 101 to transmit the confirmation of the resuming. In a case where Confirmation="false" is written, the command 6100 instructs the image forming apparatus 101 to refrain from transmitting the confirmation of the resuming. The post-processing apparatus 102 can notify the image forming apparatus 101 of whether the post-processing apparatus 102 requests the image forming apparatus 101 to confirm the resuming by transmitting the information indicating whether the communication partner transmits the confirmation of the resuming after temporarily stopping the processing together with the temporary stop command to the image forming apparatus 101.

Condition="Waste" and SetIndex="34 35" in a Part element in a portion 61003 notify the image forming apparatus 101 that spoilage is generated at the thirty-fourth set and the thirty-fifth set at the post-processing apparatus 102 due to the occurrence of the paper jam. The spoilage means the print product that becomes unusable as a product.

FIG. 6C illustrates a command for instructing the communication partner to perform the processing (for example, produce the product). In the present exemplary embodiment, this command will be referred to as the output request command or the "Pull" command. For example, the post-processing apparatus 102 can instruct the image forming apparatus 101 to print the print data by transmitting the output request command to the image forming apparatus 101.

A command 6300 is an example of the output request command that is transmitted from the post-processing apparatus 102 to the image forming apparatus 101. Type="PipePull" is written and xsi:type="CommandPipePull" is further written in a portion 63001, which make the command 6300 the output request command. The command 6300 indicates an example in which the post-processing apparatus 102 instructs the image forming apparatus 101 to resume the processing temporarily stopped according to the command 6100 because the paper jam is resolved at the post-processing apparatus 102. Therefore, SetIndex="34~–1" is written in a Part element in a portion 63002, by which the command 6300 instructs the image forming apparatus 101 to resume the processing from the thirty-fourth set. In the present example, "–1" means the execution of the processing to the last.

FIG. 6D illustrates a command for notifying the communication partner of an end of the communication. In the present exemplary embodiment, this command will be referred to as an end command or a "Close" command. In the present exemplary embodiment, FIG. 6D illustrates an example in which the image forming apparatus 101 transmits this command to the post-processing apparatus 102. However, the post-processing apparatus 102 can also transmit this command to the image forming apparatus 101. A command 6400 is an example of the end command that is transmitted from the image forming apparatus 101 to the post-processing apparatus 102. Type="PipeClose" is written and xsi:type="CommandPipeClose" is further written in a portion 64001, which make the command 6400 the end command. A portion 64002 refers to PipeID="PipeSheet" in a PipeParams element, thereby indicating an end of the communication having PipeSheet as PipeID thereof.

Each of the commands (the messages) illustrated in FIGS. 6A to 6D is merely an example, and the commands may be written by a different method. Further, the image forming apparatus 101 and the post-processing apparatus 102 may exchange the commands therebetween with use of a command (message) other than the commands described herein. Further, the commands have been described assuming that they are exchanged between the image forming apparatus 101 and the post-processing apparatus 102, but these commands may be exchanged between the image forming apparatus 101 and another apparatus than the post-processing apparatus 102.

<Sequence Diagram Illustrating Communication Processing in Information Processing System>

FIG. 7 is a sequence diagram illustrating an example of a flow of processing in which the image forming apparatus 101 and the post-processing apparatus 102 communicate with each other with use of the commands (the messages) illustrated in FIGS. 6A to 6D in the information processing system according to the present exemplary embodiment.

In FIG. 7, in step 701, the command generation unit 5104 of the image forming apparatus 101 generates a command (a connection command) for establishing a connection to the post-processing apparatus 102 supposed to perform the post-processing for a target job, and transmits the generated command via the communication processing unit 5105, when the image forming apparatus 101 starts the print processing. More specifically, the image forming apparatus 101 transmits the job ticket for the post-processing that is illustrated in FIG. 13B to the post-processing apparatus 102. The command generated and transmitted in step 701 triggers a start of the connection between the image forming apparatus 101 and the post-processing apparatus 102. Upon receiving the command, the command analysis unit 5202 of the post-processing apparatus 102 analyzes the received command, and transmits a result thereof (acceptance or rejection of the connection) to the image forming apparatus 101.

FIG. 13B illustrates the job ticket for the post-processing. The job ticket for the post-processing is a job ticket to be used for processing the job by the post-processing apparatus 102. PipeID="PipeSheet" (1601) is specified in a Component element illustrated in FIG. 13B, which leads to establishment of the communication having PipeSheet as the ID thereof. In other words, PipeID is written in the job ticket for the post-processing that is illustrated in FIG. 13B, which makes this job ticket the connection command to the post-processing apparatus 102. A Uniform Resource Locator (URL) (Uniform Resource Identifier) is written in a PipeURL attribute (1602) in the Component element illustrated in FIG. 13B, by which this job ticket can specify a connection destination of the communication. PipeProtocol="JMFPush" (1603) is specified in the Component element illustrated in FIG. 13B, by which this job ticket defines that the image forming apparatus 101 initializes the communication. A PipePause attribute (1604) and a PipeResume attribute (1605) can define predetermined values for determining whether to temporarily stop or resume the communication. When the number of resources reaches the value written in the PipePause attribute, the post-processing apparatus 102 transmits the temporary stop command (the "Pause" command) to the image forming apparatus 101. When the number of resources reaches the value written in the PipeResume attribute, the post-processing apparatus 102 transmits a processing resuming command (the "Pull" command) to the image forming apparatus 101.

FIG. 13A illustrates an example of a job ticket for the printing. The job ticket for the printing is a job ticket to be used for processing the job by the image forming apparatus 101. Print settings required when the image forming apparatus 101 prints the print data, such as a setting of double-sided printing, a setting of stapling, and sheet information, are written in the job ticket for the printing. Further, the job ticket for the printing that is illustrated in FIG. 13A may be generated by the job control unit 5102, based on print settings input on the operation unit 204 of the image forming apparatus 101. Alternatively, this job ticket may be generated by the information processing apparatus 103 and received by the image forming apparatus 101 via the communication processing unit 5105.

In step 702, the image forming apparatus 101 notifies the post-processing apparatus 102 of an output of the print product (that the resource is output) by transmitting the output notification command (the "Push" command) indicated by the command 6200 illustrated in FIG. 6B to the post-processing apparatus 102. Upon receiving the command, the command analysis unit 5202 of the post-processing apparatus 102 analyzes the received command, and transmits a result thereof (acceptance or rejection) to the image forming apparatus 101.

In step 703, upon the start of the print processing at the image forming apparatus 101, the command generation unit 5104 generates the "Push" command (for example, the command 6201 illustrated in FIG. 6B) for each resource on which the post-processing apparatus 102 performs the post-processing, and transmits the generated "Push" command to the post-processing apparatus 102. The post-processing apparatus 102 performs the post-processing on the received resource. Upon receiving the command, the command analysis unit 5202 of the post-processing apparatus 102 analyzes the received command, and transmits a result thereof (acceptance or rejection) to the image forming apparatus 101. In step 703, as many "Push" commands as the resources are transmitted to the post-processing apparatus 102.

Step 704 indicates that a suspension of the processing has occurred at the post-processing apparatus 102. In step 705, the post-processing apparatus 102 generates the "Pause" command indicating the temporary stop of the print processing to the image forming apparatus 101 by the command generation unit 5203, and transmits the generated "Pause" command to the image forming apparatus 101. Examples of possible situations under which the image forming apparatus 101 is notified of this command include the following cases. The image forming apparatus 101 may be notified of this command because a buffer for the resource exceeds a predetermined value at the post-processing apparatus 102, or may be notified of this command because a device error has occurred at the post-processing apparatus 102. For example, the post-processing apparatus 102 transmits the command 6100 illustrated in FIG. 6A to the image forming apparatus 101. Upon receiving the command, the command analysis unit 5103 of the image forming apparatus 101 analyzes the received command, and transmits a result thereof (acceptance or rejection) to the post-processing apparatus 102.

In step 706, the image forming apparatus 101 transmits the command for confirming whether the image forming apparatus 101 is permitted to resume the processing to the post-processing apparatus 102 (the "Push" command). More specifically, the image forming apparatus 101 transmits the command 6202 illustrated in FIG. 6B to the post-processing apparatus 102. The command 6202 illustrated in FIG. 6B is the output notification command in a case where the image forming apparatus 101 has resumed the printing from the thirty-fourth set. In a case where the post-processing apparatus 102 is not yet ready for resuming the processing when receiving the output notification command, the post-processing apparatus 102 recognizes that the print processing has been resumed, and transmits the temporary stop command to the image forming apparatus 101. This mechanism allows the image forming apparatus 101 to confirm whether the image forming apparatus 101 is permitted to resume the processing to the post-processing apparatus 102. Upon receiving the command, the command analysis unit 5202 of the post-processing apparatus 102 analyzes the received command, and transmits a result thereof (acceptance or rejection) to the image forming apparatus 101.

Step 707 indicates that the suspension raised in step 704 is resolved at the post-processing apparatus 102. In step 708, the post-processing apparatus 102 transmits the output request command ("Pull") to the image forming apparatus 101. More specifically, the post-processing apparatus 102 transmits the command 6300 illustrated in FIG. 6C. Upon receiving the command, the command analysis unit 5103 of the image forming apparatus 101 analyzes the received command, and transmits a result thereof (acceptance or rejection) to the post-processing apparatus 102. In step 709, the image forming apparatus 101 transmits the output notification command ("Push") every time the image forming apparatus 101 outputs the resource to the post-processing apparatus 102. More specifically, the image forming apparatus 101 transmits the command 6203 illustrated in FIG. 6B to the post-processing apparatus 102. Upon receiving the command, the command analysis unit 5202 of the post-processing apparatus 102 analyzes the received command, and transmits a result thereof (acceptance or rejection) to the image forming apparatus 101. In step 710, the command generation unit 5104 generates the "Close" command, which indicates that the image forming apparatus 101 ends the current connection because having completed outputting all resources, and transmits the generated "Close" command to the post-processing apparatus 102. More specifically, the image forming apparatus 101 transmits the command 6400 illustrated in FIG. 6D to the post-processing apparatus 102. Upon receiving the command, the command analysis unit 5202 of the post-processing apparatus 102 analyzes the received command, and transmits a result thereof (acceptance or rejection) to the image forming apparatus 101.

In the present exemplary embodiment, upon receiving the command, the communication partner analyzes the received command and transmits a result thereof (acceptance or rejection). Then, the apparatus continues the processing subsequent thereto if receiving the acceptance, and does not perform the processing subsequent thereto if receiving the rejection. FIG. 7 illustrates the sequence performed between the image forming apparatus 101 and the post-processing apparatus 102, but this sequence is not limited to being performed between these apparatuses 101 and 102.

Figure 8:
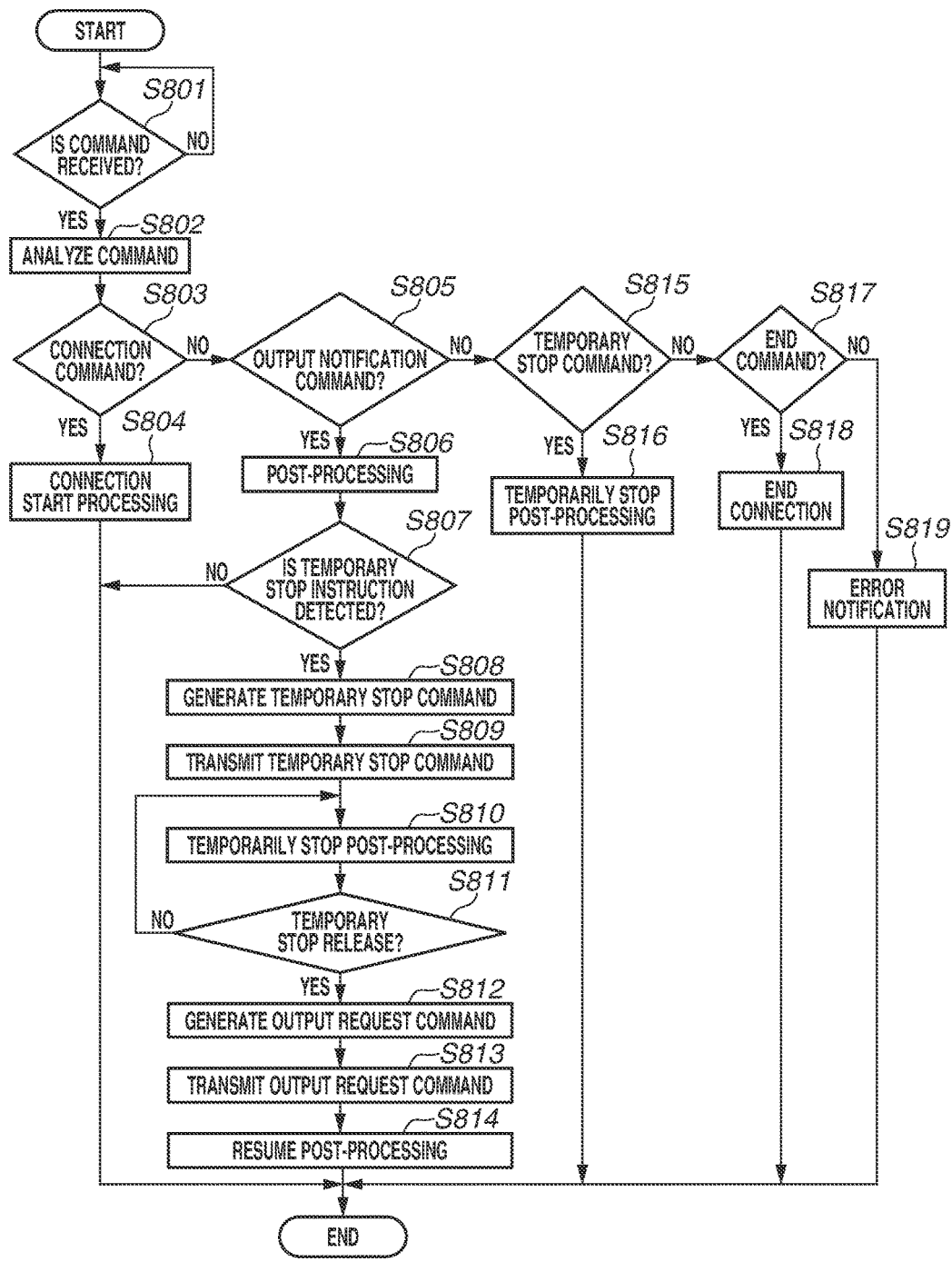
FIG. 8 illustrates a flow of processing performed by the post-processing apparatus according to the present exemplary embodiment.

FIG. 8 illustrates a flow from a time of when the post-processing apparatus 102 according to the present exemplary embodiment receives the command (the message) from another apparatus until a time of when the post-processing apparatus 102 performs the processing according to the command. The program regarding each flow is stored in the storage unit 311 of the post-processing apparatus 102, and is read into the RAM 309 to be executed by the CPU 308.

In step S801, the communication processing unit 5201 determines whether the command (the message) is received. In a case where the communication processing unit 5201 determines that the command is received (YES in step S801), the processing proceeds to step S802. In step S802, the command analysis unit 5202 analyzes the received command (the message). In step S803, the command analysis unit 5202 determines whether the analyzed command is the connection command illustrated in FIG. 13B. More specifically, the command analysis unit 5202 confirms whether the PipeID attribute is specified in the Component element illustrated in FIG. 13B. Then, in a case where the PipeID attribute is specified, the command analysis unit 5202 determines that the analyzed command is the connection command (YES in step S803). In a case where the PipeID attribute is not specified, the command analysis unit 5202 determines that the analyzed command is not the connection command (NO in step S803). In a case where the analyzed command is the connection command (YES in step S803), the processing proceeds to step S804. In a case where the analyzed command is not the connection command (NO in step S803), the processing proceeds to step S805.

In step S804, the communication processing unit 5201 performs connection start processing for the communication with the image forming apparatus 101. First, the communication processing unit 5201 stores the received connection command into the job information storage unit 5206. Next, the communication processing unit 5201 establishes the communication based on PipeID written in the connection command. More specifically, the communication processing unit 5201 acquires PipeID="PipeSheet" in the Component element illustrated in FIG. 13B, generates the connection having PipeSheet as the ID thereof, and initializes a socket for the communication with the image forming apparatus 101.

In step S805, the command analysis unit 5202 determines whether the analyzed command is the output notification command (the "Push" command). In a case where the command analysis unit 5202 determines that the analyzed command is the output notification command (YES in step S805), the processing proceeds to step S806. In a case where the command analysis unit 5202 determines that the analyzed command is not the output notification command (NO in step S805), the processing proceeds to step S815. In step S806, the job control unit 5204 instructs the device control unit 5205 to perform the post-processing, thereby causing the post-processing unit 5208 to perform the post-processing. The post-processing is performed with use of the job ticket illustrated in FIG. 13B.

In step S807, the job control unit 5204 detects a temporary stop instruction issued from the receiving unit 5209. Alternatively, the job control unit 5204 detects a temporary stop instruction issued from the device control unit 5205. In a case where the temporary stop instruction is detected (YES in step S807), the processing proceeds to step S808. In a case where the temporary stop instruction is not detected (NO in step S807), the processing is ended. The temporary stop instruction also includes the information indicating the period of time during which the temporary stop continues and the information indicating whether the resuming of the processing should be confirmed. A unit that generates the temporary stop instruction may be the receiving unit 5209 or may be the device control unit 5205. For example, if the receiving unit 5209 generates the temporary stop instruction, the temporary stop instruction is set based on an input from a screen for temporarily stopping a job, which is illustrated in FIG. 14. If the device control unit 5205 generates the temporary stop instruction, the device control unit 5205 may calculate the period of time during which the temporary stop continues according to a cause for the temporary stop, or may generate the temporary stop instruction with use of the period of time during which the temporary stop continues that is set in advance as a setting of the device.

In step S808, the command generation unit 5203 generates the temporary stop command (the "Pause" command). In step S809, the communication processing unit 5201 transmits the temporary stop command generated in step S808 to the image forming apparatus 101. In step S810, the job control unit 5204 instructs the device control unit 5205 to temporarily stop the post-processing, thereby causing the post-processing unit 5208 to stop the post-processing. In step S811, the job control unit 5204 detects a temporary stop release instruction issued from the receiving unit 5209. Alternatively, the job control unit 5204 detects a temporary stop release instruction issued from the device control unit 5205. In a case where the temporary stop release instruction is received (YES in step S811), the processing proceeds to step S812. If the temporary stop release instruction is not received (NO in step S811), the processing proceeds to step S810, and the job control unit 5204 maintains the temporary stop.

In step S812, the command generation unit 5203 generates the output request command (the "Pull" command) for instructing the image forming apparatus 101 to resume the processing as indicated by step 708 illustrated in FIG. 7. In step S813, the communication processing unit 5201 transmits the output request command generated in step S812 to the image forming apparatus 101. In step S814, the job control unit 5204 instructs the device control unit 5205 to resume the post-processing, thereby causing the post-processing unit 5208 to resume the post-processing.

In step S815, the command analysis unit 5202 determines whether the analyzed command is the temporary stop command (the "Pause" command). In a case where the command analysis unit 5202 determines that the analyzed command is the temporary stop command (YES in step S815), the processing proceeds to step S816. In a case where the command analysis unit 5202 determines that the analyzed command is not the temporary stop command (NO in step S815), the processing proceeds to step S817. In step S816, the job control unit 5204 instructs the device control unit 5205 to temporarily stop the post-processing, thereby causing the post-processing unit 5208 to stop the post-processing.

In step S817, the command analysis unit 5202 determines whether the analyzed command is the end command (the "Close" command). In a case where the command analysis unit 5202 determines that the analyzed command is the end command (YES in step S817), the processing proceeds to step S818. In a case where the command analysis unit 5202 determines that the analyzed command is not the end command (NO in step S817), the processing proceeds to step S819. In step S818, the communication processing unit 5201 ends the connection with the image forming apparatus 101. Further, the job control unit 5204 waits for an end of the post-processing performed by the post-processing unit 5208. Upon the end of the post-processing, the job control unit 5204 notifies the device control unit 5205 of the end of the post-processing, and deletes the job information from the job information storage unit 5206. In step S819, the image forming apparatus 101 is notified that the command analysis unit 5202 has failed in the analysis via the communication processing unit 5201.

Figure 9:
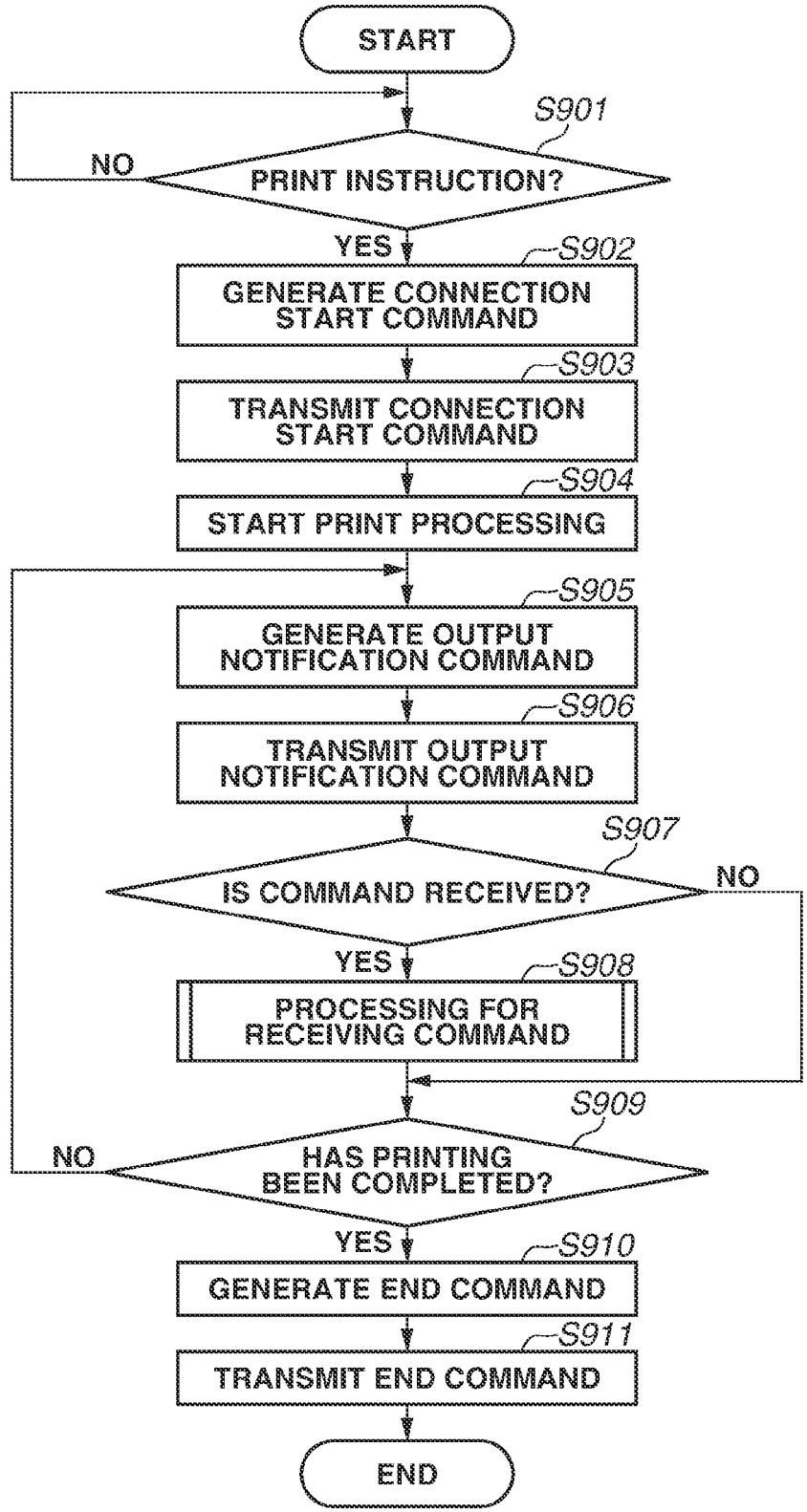
FIG. 9 illustrates a flow of processing performed by the image forming apparatus according to the present exemplary embodiment.

FIG. 9 illustrates a flow from a time of when the image forming apparatus 101 according to the present exemplary embodiment starts the print processing until a time of when the image forming apparatus 101 ends the print processing. The program regarding each flow is stored in the storage unit 212 of the image forming apparatus 101, and is read into the RAM 210 to be executed by the CPU 209.

In step S901, the job control unit 5102 determines whether the print instruction is received based on reception of the print job from another apparatus via the communication processing unit 5105 or based on an operation input onto the operation unit 204. The print job is received from, for example, the information processing apparatus 103 or the post-processing apparatus 102. In a case where the job control unit 5102 determines that the print instruction is received (YES in step S901), the processing proceeds to step S902.

In step S902, the command generation unit 5104 generates the connection start command (the job ticket illustrated in FIG. 13B) for carrying out the communication as indicated by step 701 illustrated in FIG. 7. In step S903, the image forming apparatus 101 transmits the connection start command generated by the command generation unit 5104 in step S902 to the apparatus that is the communication destination via the communication processing unit 5105. In the present exemplary embodiment, the apparatus that is the communication destination, which is described with reference to FIG. 9, is the post-processing apparatus 102.

In step S904, the job control unit 5102 causes the image forming unit 5112 to start the print processing via the device control unit 5101. For example, the print processing is sequentially performed for each unit of the product (for example, one copy at a time). In step S905, the command generation unit 5104 generates the command (the "Push" command) for notifying the apparatus that is the communication destination that the image forming apparatus 101 has started the print processing. In step S906, the image forming apparatus 101 transmits the command (the "Push" command) generated by the command generation unit 5104 in step S905 to the apparatus that is the communication destination via the communication processing unit 5105.

In step S907, the communication processing unit 5105 determines whether the command (the message) is received. In a case where the communication processing unit 5105 determines that the command is received (YES in step S907), the processing proceeds to step S908. In step S908, the communication processing unit 5105 performs processing for receiving the command illustrated in FIG. 10. In step S909, the job control unit 5102 determines whether the image forming apparatus 101 has completed processing all of the print jobs with respect to which the instruction has been received (for example, whether the image forming apparatus 101 has completed printing all copies). In a case where the job control unit 5102 determines that the image forming apparatus 101 has completed processing all of the print jobs (YES in step S909), the processing proceeds to step S910. In a case where the job control unit 5102 determines that there is still the print job left to be processed (NO in step S909), the processing proceeds to step S905 (for example, the image forming apparatus 101 performs the print processing of a next copy).

In step S910, the command generation unit 5104 generates the command indicating the end of the processing (the "Close" command). In step S911, the image forming apparatus 101 transmits the command (the "Close" command) generated by the command generation unit 5104 in step S910 to the apparatus that is the communication destination via the communication processing unit 5105.

Figure 10:
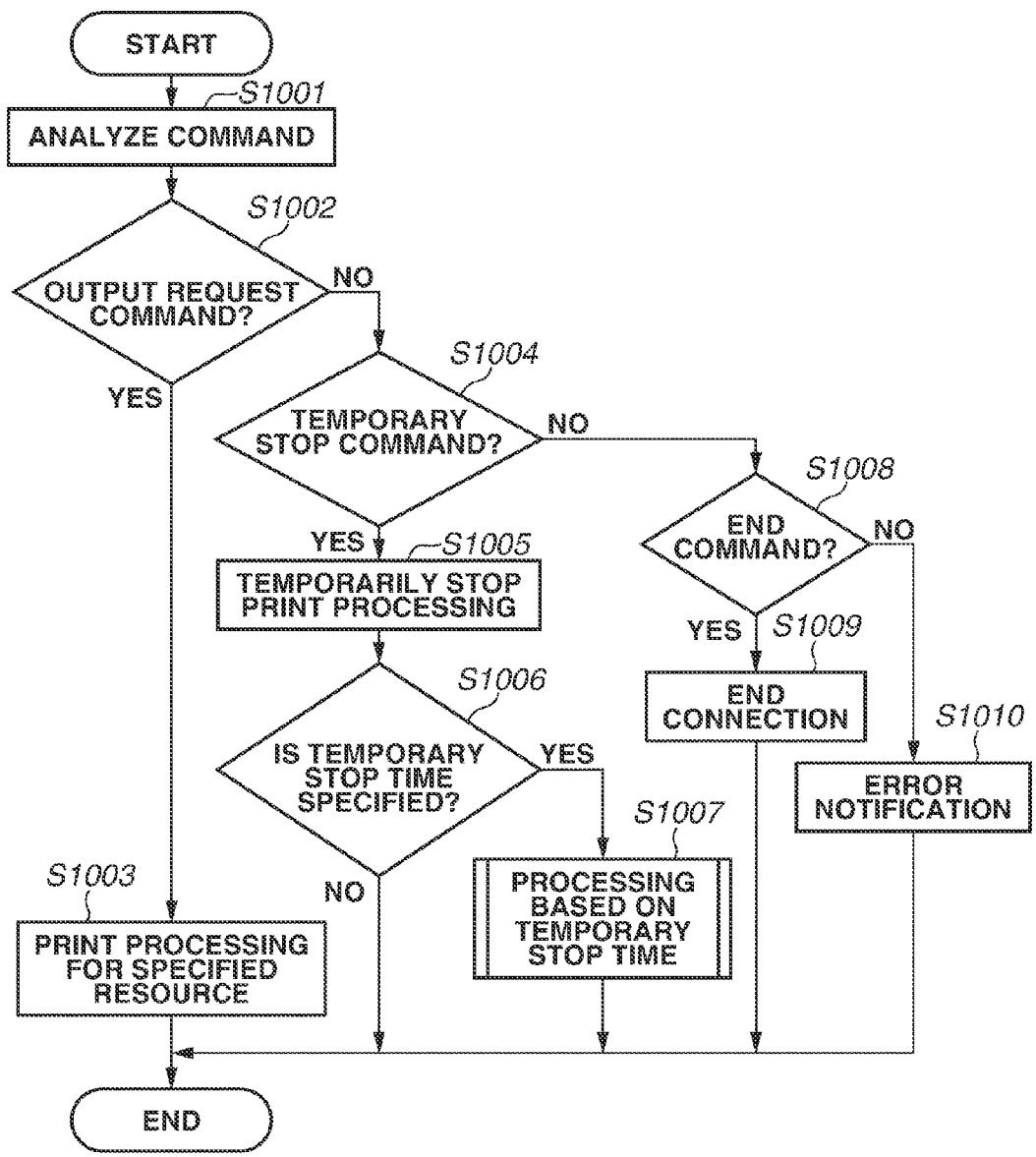
FIG. 10 illustrates a detailed flow of step S908 illustrated in FIG. 9.

FIG. 10 illustrates a detailed flow of step S908 illustrated in FIG. 9. The program regarding each flow is stored in the storage unit 212 of the image forming apparatus 101, and is read into the RAM 210 to be executed by the CPU 209.

In step S1001, the command analysis unit 5103 analyzes the received command (the message). In step S1002, the command analysis unit 5103 determines whether the analyzed command is the output request command (the "Pull" command). In a case where the command analysis unit 5103 determines that the analyzed command is the output request command (YES in step S1002), the processing proceeds to step S1003. In a case where the command analysis unit 5103 determines that the analyzed command is not the output request command (NO in step S1002), the processing proceeds to step S1004. In step S1003, the job control unit 5102 causes the image forming unit 5112 to perform the print processing via the device control unit 5101. More specifically, the image forming unit 5112 performs the print processing for the resource specified in the "Pull" command.

In step S1004, the command analysis unit 5103 determines whether the analyzed command is the temporary stop command (the "Pause" command). In a case where the command analysis unit 5103 determines that the analyzed command is the temporary stop command (YES in step S1004), the processing proceeds to step S1005. In a case where the command analysis unit 5103 determines that the analyzed command is not the temporary stop command (NO in step S1004), the processing proceeds to step S1008. In step S1005, the job control unit 5102 instructs the device control unit 5101 to temporarily stop the print processing, thereby causing the image forming unit 5112 to stop the print processing. More specifically, the image forming unit 5112 temporarily stops the job corresponding to the job ID specified in the "Pause" command. In step S1006, the command analysis unit 5103 determines whether the information indicating the period of time during which the temporary stop continues is specified in the analyzed temporary stop command. In a case where the command analysis unit 5103 determines that the information indicating the period of time during which the temporary stop continues is specified in the analyzed temporary stop command (YES in step S1006), the processing proceeds to step S1007. In a case where the command analysis unit 5103 determines the information indicating the period of time during which the temporary stop continues is not specified in the analyzed temporary stop command (NO in step S1006), the processing is ended. In step S1007, the job control unit 5102 processes the job based on the temporary stop time.

In step S1008, the command analysis unit 5103 determines whether the analyzed command is the end command (the "Close" command). In a case where the command analysis unit 5103 determines that the analyzed command is the end command (YES in step S1008), the processing proceeds to step S1009. In a case where the analyzed command is not the end command (NO in step S1008), the processing proceeds to step S1010. In step S1009, the communication processing unit 5105 ends the connection with the apparatus to which the image forming apparatus 101 is currently connected. Further, the job control unit 5102 waits for an end of the print processing performed by the image forming unit 5112. Upon the end of the print processing, the job control unit 5102 notifies the device control unit 5101 of the end of the print processing, and deletes this job information from the job information storage unit 5107. In step S1010, the apparatus to which the image forming apparatus 101 is currently connected is notified that the command analysis unit 5103 has failed in the analysis via the communication processing unit 5105.

In the present exemplary embodiment, in a case where the information indicating the period of time during which the temporary stop continues is specified in the temporary stop command, the image forming apparatus 101 temporarily stops the job in process, and processes another job within the period of time during which the temporary stop continues. In other words, the image forming apparatus 101 can improve productivity of the image forming apparatus 101 by receiving not only the temporary stop command but also the information indicating the period of time during which the temporary stop continues.

Figure 11:
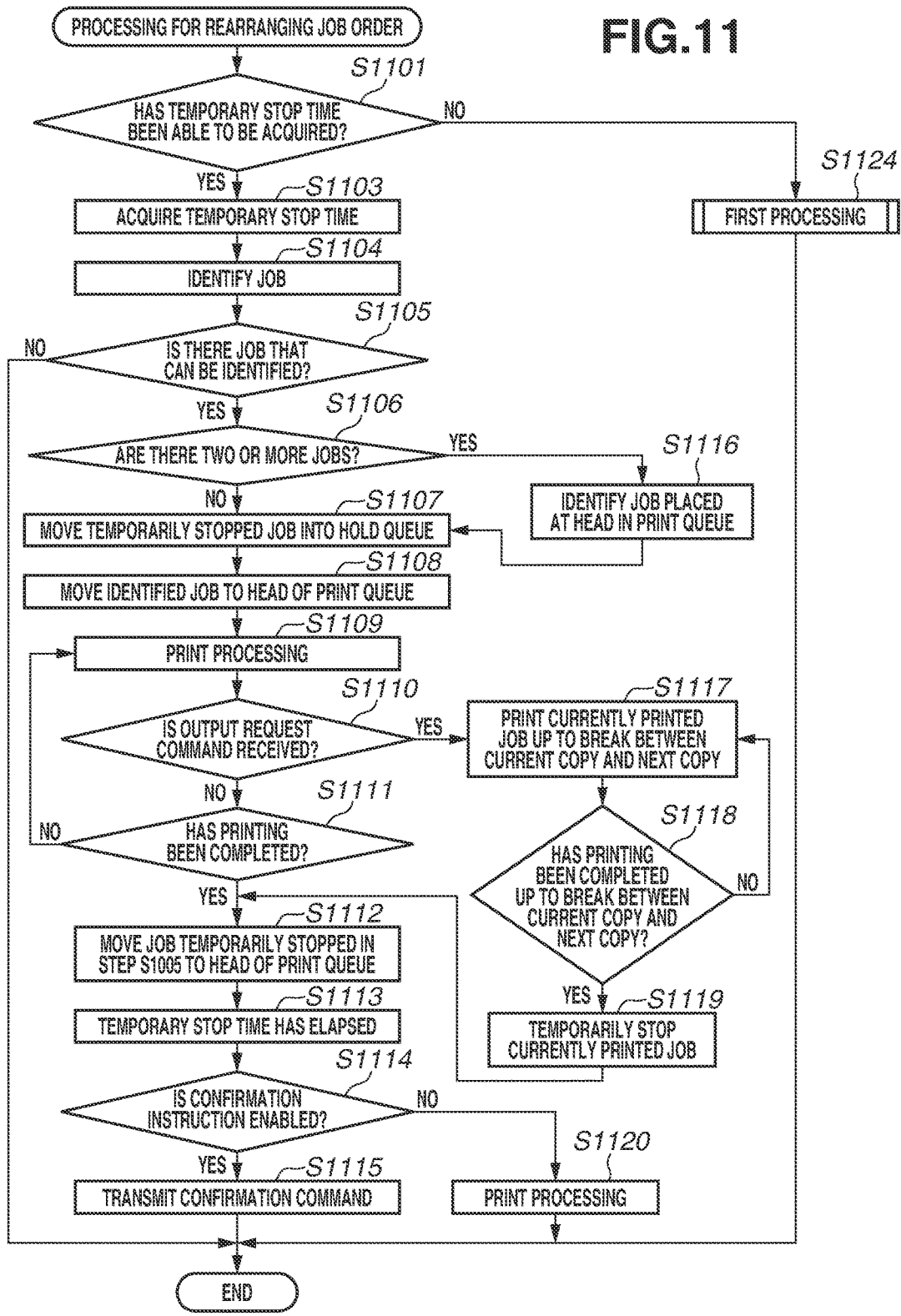
FIG. 11 illustrates a detailed flow of step S1007 illustrated in FIG. 10.

FIG. 11 illustrates a detailed flow of step S1007 illustrated in FIG. 10. The program regarding each flow is stored in the storage unit 212 of the image forming apparatus 101, and is read into the RAM 210 to be executed by the CPU 209.

In step S1101, the job identification unit 5108 determines whether the information indicating the period of time during which the temporary stop continues can be acquired. In a case where the job identification unit 5108 determines that the information indicating the period of time during which the temporary stop continues can be acquired (YES in step S1101), the processing proceeds to step S1103. In a case where the job identification unit 5108 determines that the information indicating the period of time during which the temporary stop continues cannot be acquired (NO in step S1101), the processing proceeds to step S1124. In step S1103, the command analysis unit 5103 acquires the information indicating the period of time during which the temporary stop continues from the temporary stop command. More specifically, the command analysis unit 5103 acquires the Duration attribute and the Unit attribute in the temporary stop command 6100 illustrated in FIG. 6A. In step S1104, the job identification unit 5108 acquires a processing time of each job in the Print queue with use of the information stored in the job information storage unit 5107, and identifies a job to be processed in a processing time that falls within the temporary stop time. In the example illustrated in FIG. 16, the job identification unit 5108 identifies two jobs (jobs having job names J2 and J3, respectively) in the Print queue and processable within the temporary stop time of 10 minutes. Then, the job identification unit 5108 identifies a job not supposed to be processed by the post-processing apparatus 102 that has transmitted the temporary stop command, from the identified jobs by referring to the setting of the post-processing in the information illustrated in FIG. 16. For example, if the post-processing apparatus 102 is a case binding apparatus, the job identification unit 5108 identifies J3 for which the case binding is not supposed to be performed, from the two jobs.

In step S1105, the job control unit 5102 determines whether there is a job identified in step S1104. In a case where the job control unit 5102 determines that there is an identified job (YES in step S1105), the processing proceeds to step S1106. In a case where the job control unit 5102 determines that there is no identified job (NO in step S1105), the present processing flow is ended. In step S1106, the job control unit 5102 determines whether there are two or more jobs identified in step S1104. In a case where the job control unit 5102 determines that there are two or more identified jobs (YES in step S1106), the processing proceeds to step S1116. In a case where the job control unit 5102 determines that there is only one identified job (NO in step S1106), the processing proceeds to step S1107. In step S1107, the order rearrangement unit 5110 moves the temporarily stopped job from the head of the Print queue to the head of the Hold queue. For example, the order rearrangement unit 5110 moves the job ("J1") in a Print queue 1300 illustrated in FIG. 15 into a Hold queue 1301. As a result of this movement, the job J1 is queued as indicated by a Hold queue 1303. In step S1108, the order rearrangement unit 5110 moves the job identified in step S1104 or S1116 to the head of the Print queue. For example, the order rearrangement unit 5110 moves the job ("J3") in the Print queue 1300 illustrated in FIG. 15 to the head of the Print queue 1300. As a result of this movement, the job J3 is queued as indicated by a Print queue 1302.

In step S1109, the job control unit 5102 starts printing the job moved to the head of the Print queue. The device control unit 5101 prints the job upon receiving an instruction to start printing the job from the job control unit 5102. In step S1110, the job control unit 5102 reads a result of the analysis of the command received by the communication processing unit 5105 while the job is being printed, and determines whether this received command is the output request command (the "Pull" command) with respect to the temporarily stopped job. In a case where the job control unit 5102 determines that the received command is the output request command with respect to the temporarily stopped job (the "Pull" command) (YES in step S1110), the processing proceeds to step S1117. In a case where the job control unit 5102 determines that the received command is a different command (NO in step S1110), the processing proceeds to step S1111. In step S1111, the job control unit 5102 determines whether the image forming apparatus 101 has completed printing the job. In a case where the job control unit 5102 determines that the image forming apparatus 101 has completed printing the job (YES in step S1111), the processing proceeds to step S1112. In a case where the job control unit 5102 determines that the image forming apparatus 101 has not yet completed printing the job (NO in step S1111), the processing returns to step S1109, and the print processing continues. In step S1112, the order rearrangement unit 5110 moves the job temporarily stopped in step S1005 from the Hold queue to the head of the Print queue.

In step S1113, the resuming confirmation unit 5111 detects that the temporary stop time specified in the temporary stop command has elapsed. In step S1114, the resuming confirmation unit 5111 determines whether the instruction to confirm the resuming of the processing is enabled in the temporary stop command. More specifically, the resuming confirmation unit 5111 determines whether the Confirmation attribute included in the temporary stop command 6100 illustrated in FIG. 6A is set to true. In a case where the resuming confirmation unit 5111 determines that the instruction to confirm the resuming of the processing is enabled (YES in step S1114), the processing proceeds to step S1115. In a case where the resuming confirmation unit 5111 determines that the instruction to confirm the resuming of the processing is not enabled or is not written in the temporary stop command (NO in step S1114), the processing proceeds to step S1120, and the image forming apparatus 101 resumes the print processing. In step S1115, the resuming confirmation unit 5111 instructs the job control unit 5102 to confirm the resuming of the processing. The job control unit 5102 instructs the command generation unit 5104 to generate the output notification command. The command generation unit 5104 generates the output notification command (the "Push" command). More specifically, for example, the command generation unit 5104 generates the command 6202 illustrated in FIG. 6B. Processing performed according to a response to the output notification command (the "Push" command) is similar to steps S907 (the determination about whether the command is received) and S908 (the processing for receiving the command) illustrated in FIG. 9. In step S1116, the job control unit 5102 selects, from the plurality of identified jobs, a job placed closer to the head in the Print queue than the other job(s). In other words, the job control unit 5102 selects a job having an early processing order.

In step S1117, the job control unit 5102 instructs the device control unit 5101 to print the currently printed job up to a break between a current copy and a next copy. The job control unit 5102 preferentially resumes the processing for the job temporarily stopped in step S1005 with respect to which the instruction to resume the job has been issued from the post-processing apparatus 102 over the job currently in process. In step S1118, the job control unit 5102 determines whether the image forming apparatus 101 has completed printing the currently printed job up to the break between the current copy and the next copy. In a case where the job control unit 5102 determines that the image forming apparatus 101 has completed printing the currently printed job up to the break between the current copy and the next copy (YES in step S1118), the processing proceeds to step S1119. In a case where the job control unit 5102 determines that the image forming apparatus 101 has not yet completed printing the currently printed job up to the break between the current copy and the next copy (NO in step S1118), the processing returns to step S1117, and the printing continues. In step S1119, the job control unit 5102 temporarily stops the currently printed job started in step S1109. Then, the processing proceeds to step S1112. In step S1124, the image forming apparatus 101 performs first processing, which will be described with reference to FIG. 12.

Figure 12:
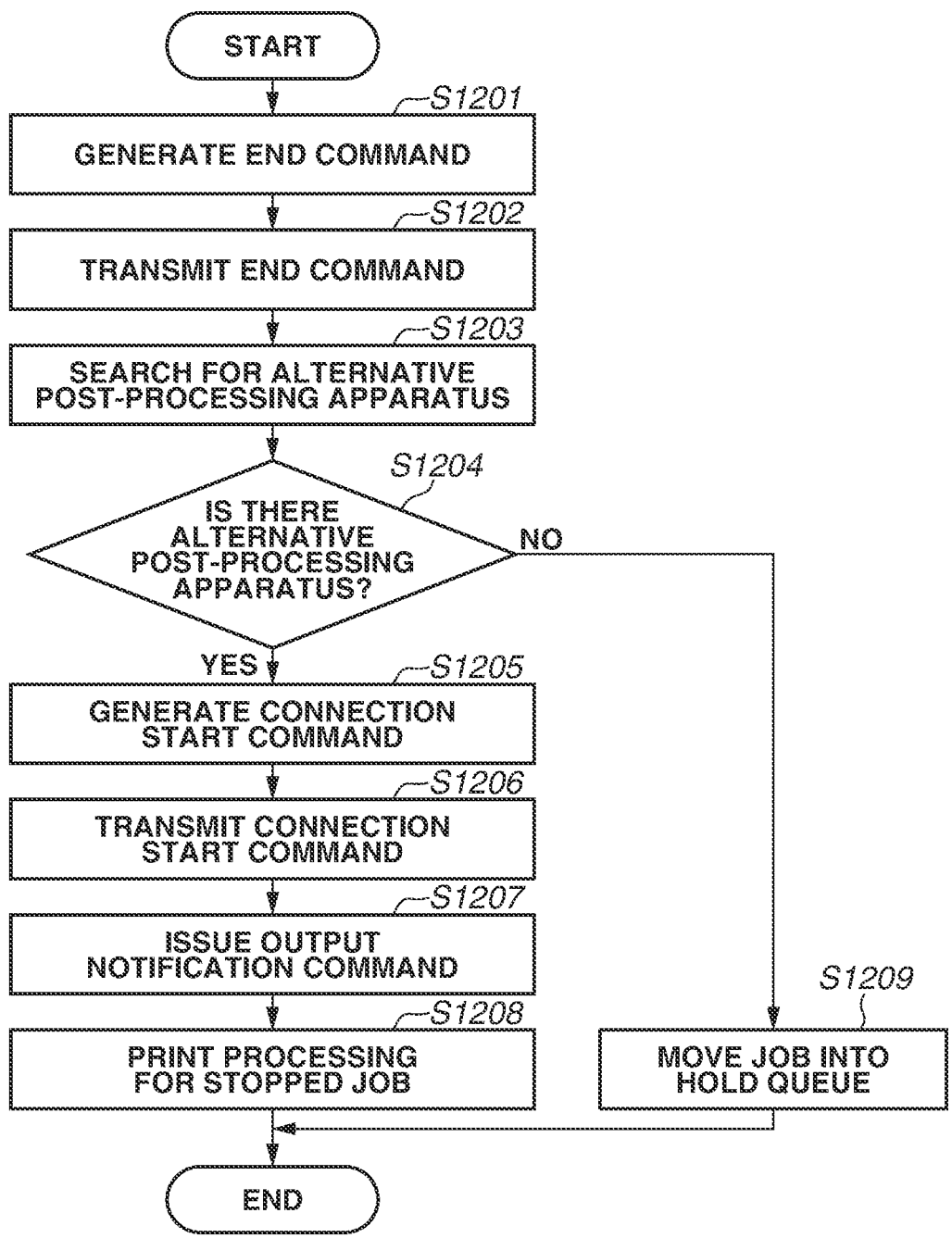
FIG. 12 illustrates a detailed flow of step S1124 illustrated in FIG. 11.

FIG. 12 illustrates a detailed flow of step S1124 illustrated in FIG. 11, and a flow of processing performed in a case where the information indicating the period of time during which the temporary stop continues cannot be acquired. Being unable to acquire the information indicating the period of time during which the temporary stop continues means that a character string other than a numerical value is written in the Duration attribute in the temporary stop command 6100 illustrated in FIG. 6A. For example, in a case where a character string, such as NaN and Error is written in the Duration attribute, it can be regarded that a failure unresolvable by the post-processing apparatus 102 side has occurred.

In step S1201, the job control unit 5102 instructs the command generation unit 5104 to generate the end command ("Close"). The command generation unit 5104 generates the end command. In step S1202, the communication processing unit 5105 transmits the end command to the post-processing apparatus 102.

In step S1203, the job control unit 5102 searches for an alternative post-processing apparatus. More specifically, the job control unit 5102 may search for a post-processing apparatus having a similar post-processing capability to the post-processing apparatus 102 connected to the image forming apparatus 101, or may search for a post-processing apparatus capable of performing the post-processing for the job in process based on the information indicating the setting of the post-processing set to the job in process. In step S1204, the job control unit 5102 determines whether there is an alternative post-processing apparatus. In a case where the job control unit 5102 determines that there is an alternative post-processing apparatus (YES in step S1204), the processing proceeds to step S1205. In a case where the job control unit 5102 determines that there is no alternative post-processing apparatus (NO in step S1204), the processing proceeds to step S1209. In step S1205, the command generation unit 5104 generates the connection start command for carrying out communication. In step S1206, the image forming apparatus 101 transmits the connection start command generated by the command generation unit 5104 in step S1205 to the alternative post-processing apparatus via the communication processing unit 5105.

In step S1207, the job control unit 5102 instructs the command generation unit 5104 to issue the output notification command for communicating with the alternative post-processing apparatus. The command generation unit 5104 generates the output notification command, and the communication processing unit 5105 transmits the output notification command to the alternative post-processing apparatus. In step S1208, the job control unit 5102 causes the image forming unit 5112 to start the print processing via the device control unit 5101. The print processing is sequentially performed for each unit of the product (for example, one copy at a time).

In step S1209, the order rearrangement unit 5110 moves the job into the Hold queue. This rearrangement allows the printing to be resumed by, for example, a selection of this job and issue of an instruction to process this job on the operation unit 204 of the image forming apparatus 101 when the failure is resolved at the post-processing apparatus 102.

FIGS. 14A and 14B illustrate examples of the screen for temporarily stopping a job, which is displayed on the operation unit 304 of the post-processing apparatus 102 illustrated in FIG. 3.

FIG. 14A illustrates an example of the screen for temporarily stopping a job. A textbox 1401 receives an input of the job ID. The job stored in the job information storage unit 5206 is identified based on the job ID input in the textbox 1401. A textbox 1402 receives PipeID for identifying communication for each job exchanged between the post-processing apparatus 102 and the image forming apparatus 101. The control performed for the textbox 1402 as the user interface may be any kind of control as long as this control can be used for identifying communication for each job, and may be, for example, a drop-down list or a list box. A textbox 1403 receives the waiting time of the temporary stop. In a case where a numerical value is input in the textbox 1403, the input numerical value is used as the waiting time of the temporary stop. Further, a character string, such as NaN and Error may be input if the time cannot be defined due to a failure of the device or the like. A drop-down list 1404 specifies a unit of the temporary stop time input in the textbox 1403. Any value among "day", "hour", "minute", and "second" can be selected from the drop-down list 1404. A check box 1405 is used for specifying whether it is desired for the image forming apparatus 101 to confirm the resuming of the processing to the post-processing apparatus 102 in a case where the post-processing apparatus 102 does not transmit the output request command to the image forming apparatus 101 even after the temporary stop time input in the textbox 1403 has elapsed. In a case where the check box 1405 is checked, the instruction to confirm the resuming of the processing is enabled (Confirmation="true") in the temporary stop command transmitted from the post-processing apparatus 102 to the image forming apparatus 101. A button 1406 is used for issuing the command for temporarily stopping the processing performed together with the communication partner. When the temporary stop button 1406 is pressed, the temporary stop command is transmitted to the image forming apparatus 101.

FIG. 14B illustrates another example of the screen for temporarily stopping a job.

Radio buttons 1407 receive the waiting time of the temporary stop. In the present exemplary embodiment, this screen requests a selection of a numerical value, such as "one hour", "thirty minutes", and "ten minutes" with use of the radio buttons 1407. The waiting time of the temporary stop can be specified by the selection of the radio button 1407. These numeral values are merely an example and a different numerical value may be used. Further, in the present exemplary embodiment, three values are displayed as the values of the radio buttons 1407, but any number of values may be displayed as needed.

In the present exemplary embodiment, the inputs of the stop time and the like have been described based on the example in which the stop time and the like are input via the screen for temporarily stopping a job, but the input method is not limited thereto. For example, the stop time may be input with use of a barcode indicating the stop time.

As described above, in the present exemplary embodiment, the image forming apparatus 101 confirms the resuming to the post-processing apparatus 102 after the temporary stop time has elapsed, in a case where the image forming apparatus 101 has received the information instructing the image forming apparatus 101 to transmit the confirmation of the resuming. Then, the image forming apparatus 101 resumes the processing without confirming the resuming to the post-processing apparatus 102 after the temporary stop time has elapsed, in a case where the image forming apparatus 101 has received the information instructing the image forming apparatus 101 not to transmit the confirmation of the resuming. Therefore, both the post-processing apparatus 102 and the image forming apparatus 101 can smoothly resume the processing without performing unnecessary processing, so that the productivity can be improved.

As described above, in a case where the temporary stop command is issued with respect to the job in process from the post-processing apparatus 102 to the image forming apparatus 101 while the information processing system according to the present exemplary embodiment processes the job by the print processing and the post-processing in parallel, the image forming apparatus 101 acquires the information indicating the temporary stop time. The image forming apparatus 101 can print another job during the temporary stop time by replacing the temporarily stopped job with the other job, based on the information indicating the temporary stop time, so that the productivity of the entire information processing system can be improved.

Further, the image forming apparatus 101 can determine whether another job can be printed by being set to confirm the resuming to the post-processing apparatus 102 when the temporary stop time has elapsed, so that the productivity of the entire information processing system can be improved.

Further, on the post-processing apparatus 102 side, an unnecessary waiting time is no longer needed when the post-processing apparatus 102 resumes the temporarily stopped job in process. On the image forming apparatus 101 side, the image forming apparatus 101 can print another received job while waiting for the resuming of the temporarily stopped job in process. In other words, the productivity of the entire information processing system can be improved.

According to the above-described exemplary embodiment, the deterioration in the productivity of the entire system can be reduced even when the print processing performed by the image forming apparatus is temporarily stopped according to the instruction from the post-processing apparatus that performs the post-processing on the product printed by the image forming apparatus.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2015-081158, filed Apr. 10, 2015, which is hereby incorporated by reference herein in its entirety.

What is claimed is:

1. A system comprising:
a printing apparatus; and
a post-processing apparatus,
wherein the post-processing apparatus includes:
a processor; and
a memory storing at least one program which, when executed by the processor, causes the post-processing apparatus to:
perform post-processing on a product printed by the printing apparatus, and
transmit a command for a temporary stop of print processing for a first job and information indicating a period of time during which the temporary stop continues to the printing apparatus, and
wherein the printing apparatus includes:
a processor; and
a memory storing at least one program which, when executed by the processor of the printing apparatus, causes the printing apparatus to:
receive the command for the temporary stop of the print processing for the first job and the information indicating the period of time during which the temporary stop continues from the post-processing apparatus,
stop the print processing for the first job according to the command for the temporary stop, and
control, based on the received information indicating the period of time during which the temporary stop continues, print processing for a second job processable within the period of time during which the temporary stop continues.

2. The system according to claim 1, wherein the printing apparatus performs print processing for a job that is printable within the period of time during which the temporary stop continues and does not require the post-processing performed by the post-processing apparatus.

3. The system according to claim 1, wherein the post-processing apparatus transmits the command for the temporary stop of the print processing for the first job, the information indicating the period of time during which the temporary stop continues, and information indicating whether the printing apparatus confirms resuming after an elapse of the period of time during which the temporary stop continues.

4. The system according to claim 1, wherein the post-processing apparatus further receives an instruction to release the temporary stop of the print processing for the first job, and
wherein the post-processing apparatus transmits the instruction to release the temporary stop of the print processing for the first job to the printing apparatus, in a case where the post-processing apparatus receives the instruction to release the temporary stop of the print processing for the first job.

5. A printing apparatus comprising:
a processor; and
a memory storing at least one program which, when executed by the processor, causes the printing apparatus to:
receive a command for a temporary stop of print processing for a first job and information indicating a period of time during which the temporary stop continues from a post-processing apparatus configured to perform post-processing on a product printed by the printing apparatus;
stop the print processing for the first job according to the command for the temporary stop; and
control, based on the received information indicating the period of time during which the temporary stop continues, print processing for a second job processable within the period of time during which the temporary stop continues.

6. The printing apparatus according to claim 5, wherein the printing apparatus performs print processing for a job that is printable within the period of time during which the temporary stop continues and does not require the post-processing performed by the post-processing apparatus.

7. The printing apparatus according to claim 5, wherein the printing apparatus receives the command for the temporary stop of the print processing for the first job, the information indicating the period of time during which the temporary stop continues, and information indicating whether the printing apparatus confirms resuming after an elapse of the period of time during which the temporary stop continues.

8. A method for controlling a printing apparatus, the method comprising:
performing printing;
receiving a command for a temporary stop of print processing for a first job and information indicating a period of time during which the temporary stop continues from a post-processing apparatus configured to perform post-processing on a product printed by the printing;
stopping the print processing for the first job according to the command for the temporary stop; and
controlling, based on the received information indicating the period of time during which the temporary stop continues, print processing for a second job processable within the period of time during which the temporary stop continues.

9. A non-transitory computer-readable storage medium storing at least one program for causing a computer to execute a method for controlling a printing apparatus, the method comprising:
performing printing;
receiving a command for a temporary stop of print processing for a first job and information indicating a period of time during which the temporary stop continues from a post-processing apparatus configured to perform post-processing on a product printed by the printing;
stopping the print processing for the first job according to the command for the temporary stop; and
controlling, based on the received information indicating the period of time during which the temporary stop continues, print processing for a second job processable within the period of time during which the temporary stop continues.

* * * * *